United States Patent
Au et al.

(10) Patent No.: US 10,356,608 B2
(45) Date of Patent: Jul. 16, 2019

(54) SYSTEM AND METHOD OF USER EQUIPMENT STATE CONFIGURATIONS

(71) Applicants: Kelvin Kar Kin Au, Kanata (CA); Jianglei Ma, Ottawa (CA)

(72) Inventors: Kelvin Kar Kin Au, Kanata (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 15/436,387

(22) Filed: Feb. 17, 2017

(65) Prior Publication Data

US 2017/0245140 A1 Aug. 24, 2017

Related U.S. Application Data

(60) Provisional application No. 62/296,911, filed on Feb. 18, 2016.

(51) Int. Cl.

| | |
|---|---|
| *H04W 4/00* | (2018.01) |
| *H04W 8/22* | (2009.01) |
| *H04W 52/02* | (2009.01) |
| *H04W 84/00* | (2009.01) |
| *H04W 76/25* | (2018.01) |

(52) U.S. Cl.
CPC ......... *H04W 8/22* (2013.01); *H04W 52/0209* (2013.01); *H04W 76/25* (2018.02); *H04W 84/00* (2013.01); *Y02D 70/1242* (2018.01); *Y02D 70/1262* (2018.01); *Y02D 70/21* (2018.01); *Y02D 70/24* (2018.01)

(58) Field of Classification Search
CPC . H04W 52/0209; H04W 76/25; H04W 84/00; H04W 8/22; H04W 76/27; H04W 52/0212; Y02D 7/00; Y02D 70/1242; Y02D 70/1262; Y02D 70/21; Y02D 70/24
See application file for complete search history.

(56) References Cited

U.S. PATENT DOCUMENTS

| | | |
|---|---|---|
| 2008/0070556 A1 | 3/2008 | Bhattacharjee et al. |
| 2013/0091552 A1 | 4/2013 | Cheng et al. |
| 2013/0301418 A1* | 11/2013 | Ding .................. H04W 76/27 370/241 |

(Continued)

FOREIGN PATENT DOCUMENTS

| | | |
|---|---|---|
| CN | 101039208 A | 9/2007 |
| CN | 101115292 A | 3/2008 |

(Continued)

OTHER PUBLICATIONS

El Hattachi, Rachid, et al, NGMN 5G White Paper (Version 1), 3GPP, Feb. 17, 2015, pp. 1-125.

(Continued)

*Primary Examiner* — Barry W Taylor

(57) ABSTRACT

Methods and devices that support multiple user equipment (UE) state configurations in a wireless network are provided. A state configuration is selected for a UE from among a plurality of candidate state configurations. Each candidate state configuration is associated with a respective set of one or more predefined operating states from among a plurality of predefined operating states. Information regarding the selected state configuration is then transmitted to the UE.

60 Claims, 13 Drawing Sheets

(56) References Cited

U.S. PATENT DOCUMENTS

| | | | |
|---|---|---|---|
| 2014/0073287 A1 | 3/2014 | Zhang et al. | |
| 2014/0086177 A1 | 3/2014 | Adjakple et al. | |
| 2014/0198768 A1 | 7/2014 | Hahn et al. | |
| 2015/0195788 A1 | 7/2015 | Au et al. | |
| 2015/0319744 A1 | 11/2015 | Jung et al. | |
| 2015/0373195 A1 | 12/2015 | Wen et al. | |
| 2016/0036678 A1 | 2/2016 | Zhang et al. | |
| 2016/0227481 A1 | 8/2016 | Au et al. | |
| 2016/0249353 A1 | 8/2016 | Nakata et al. | |
| 2016/0295633 A1 | 10/2016 | Baligh et al. | |
| 2016/0353453 A1 | 12/2016 | Au et al. | |
| 2017/0070266 A1 | 3/2017 | Ma et al. | |
| 2017/0079059 A1* | 3/2017 | Li | H04W 16/02 |
| 2017/0164349 A1* | 6/2017 | Zhu | H04W 28/0247 |
| 2017/0231029 A1* | 8/2017 | Pelletier | H04W 76/046 |
| 2017/0245213 A1* | 8/2017 | Martinez Tarradell | H04W 4/70 |

FOREIGN PATENT DOCUMENTS

| | | |
|---|---|---|
| CN | 101426258 | 5/2009 |
| CN | 102056113 A | 5/2011 |
| CN | 103188729 A | 7/2013 |
| CN | 103269282 A | 8/2013 |
| CN | 104125347 A | 10/2014 |
| CN | 104620653 A | 5/2015 |
| CN | 104737609 A | 6/2015 |
| CN | 104767677 A | 7/2015 |
| CN | 104955172 A | 9/2015 |
| CN | 105981413 A | 9/2016 |
| EP | 2800413 A1 | 5/2014 |
| WO | 2014000602 A1 | 3/2014 |
| WO | 20141466399 A1 | 10/2014 |
| WO | 2014191053 A1 | 12/2014 |
| WO | 2015056392 A1 | 4/2015 |

OTHER PUBLICATIONS

ETSI MCC, Report of 3GPP RAN Workshop on "5G", RWS-150076, 3GPP, Sep. 18, 2015, pp. 1-40, Phoenix, USA.

Abdelhamid, Ayman, et al, Resource Scheduling for Heterogeneous Traffic in LTE Virtual Networks, 2015 6th IEEE International Conference on Mobile Data Management, Jun. 30, 2015, pp. 1-6, USA.

XP051087747 3GPP TR 23.799 V0.2.0 (Jun. 2016),3rd Generation Partnership Project;Technical Specification Group Services and System Aspects;Study on Architecture for Next Generation System(Release 14), total 18 pages.

XP051211905 R2-1701216 Huawei, HiSilicon,"RRC Support for Network Slicing",3GPP TSG-RAN WG2#97,Athens, Greece, Feb. 13-17, 2017, total 4 pages.

\* cited by examiner

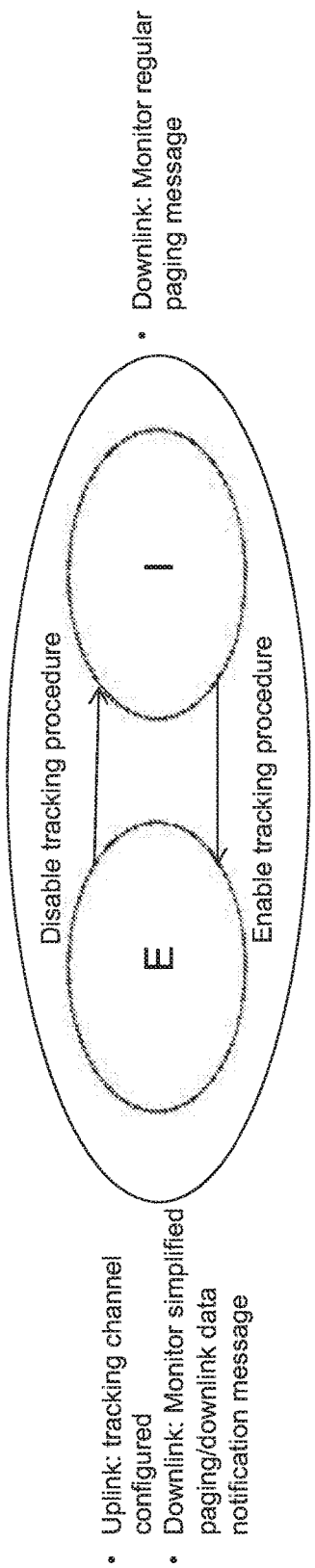
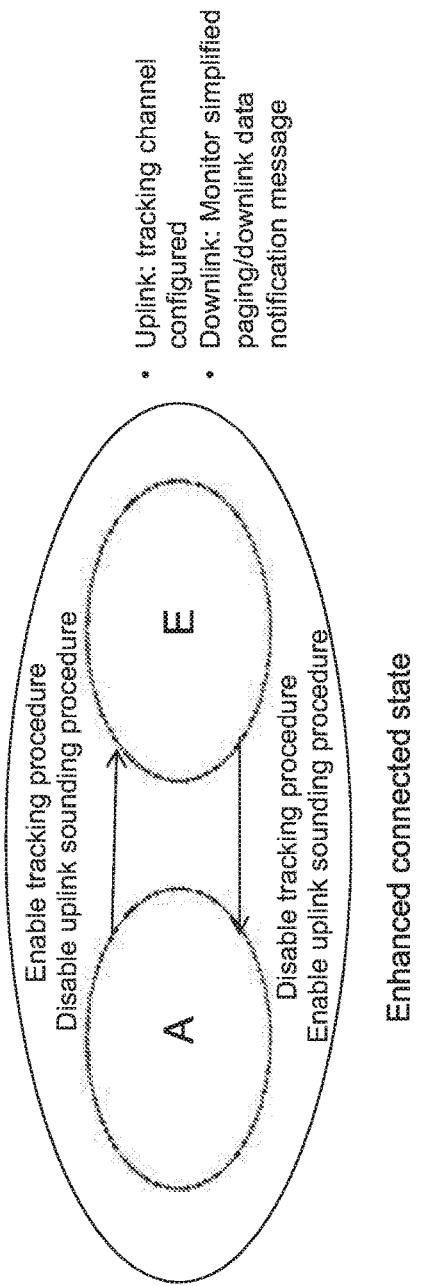
FIG. 4B
FIG. 4C

SYSTEM AND METHOD OF USER EQUIPMENT STATE CONFIGURATIONS

CROSS-REFERENCE TO RELATED APPLICATION

This application claims the benefit of U.S. Provisional Patent Application No. 62/296,911 entitled "System and Method of User Equipment State Configurations" filed Feb. 18, 2016, the entire content of which is incorporated herein by reference.

FIELD

The present disclosure relates to wireless communication generally, and, in particular embodiments, to a system and method for user equipment state configurations.

BACKGROUND

User Equipment (UE) devices (e.g., smartphones, tablets) are becoming more connected to Evolved NodeBs (eNB)s with not only different services running in the foreground (referred to as foreground services) but also with different services running in the background (referred to as background services). UEs may also be commonly referred to as terminals, subscribers, users, mobile stations, mobiles, and the like. eNBs may also be commonly referred to as NodeBs, base stations, controllers, communications controllers, access points, and the like.

Foreground services (and associated message traffic-"foreground traffic") include video streaming, web browsing, file transfer, games, and the like. Background services (and associated message traffic-"background traffic") include keep alive messages generated by a mobile operating system or instant messaging, reports generated by sensors and/or smart meters, and the like.

Providing always on connectivity (maintaining an existing connection to enable low latency communications rather than permitting an existing connection to end and re-establishing another connection when needed) while conserving energy (to extend battery life, for example) is an ongoing challenge.

SUMMARY

A first aspect of the present disclosure provides a method for supporting multiple user equipment (UE) state configurations in a wireless network. The method according to the first aspect comprises: selecting, by a network device for a UE, a state configuration from among a plurality of candidate state configurations, each candidate state configuration being associated with a respective one or more predefined operating states; and transmitting, by the network device, information to the UE regarding the selected state configuration.

In some embodiments of the method according to the first aspect of the present disclosure selecting a state configuration comprises selecting a state configuration based at least in part on at least one of: a UE type associated with the UE; and one or more services supported by the UE.

In some embodiments of the method according to the first aspect of the present disclosure, the method further comprises receiving, by the network device, as part of a UE air interface capability exchange procedure, information regarding at least one of: the UE type associated with the UE; and the one or more services supported by the UE.

In some embodiments of the method according to the first aspect of the present disclosure, the method further comprises: receiving, by the network device, as part of a UE supported service change procedure, information regarding a change to the one or more services supported by the UE; responsive to receiving the information regarding the change to the one or more services supported by the UE, selecting, by the network device, a replacement state configuration from among the plurality of candidate state configurations based at least in part on the information regarding the change to the one or more services supported by the UE; and transmitting, by the network device, information to the UE regarding the selected replacement state configuration.

In some embodiments of the method according to the first aspect of the present disclosure:
selecting a state configuration from among a plurality of candidate state configurations comprises:
selecting a first state configuration based at least in part on a first service supported by the UE; and
selecting a second state configuration based at least in part on a second service supported by the UE; and
transmitting, to the UE, information regarding the selected state configuration comprises transmitting, to the UE, information regarding the selected first and second state configurations.

In some embodiments of the method according to the first aspect of the present disclosure, the method further comprises:
providing the first service in a first network slice in accordance with the first state configuration; and
providing the second service in a second network slice in accordance with the second state configuration.

In some embodiments of the method according to the first aspect of the present disclosure:
selecting a state configuration from among the plurality of candidate state configurations comprises selecting a state configuration for multiple network slices supported by the UE, each of the multiple network slices being associated with a respective state configuration among the plurality of candidate state configurations; and
the method further comprising:
providing a first service to the UE in a first network slice of the multiple network slices supported by the UE in accordance with the selected state configuration; and
providing a second service to the UE in a second network slice of the multiple network slices supported by the UE in accordance with the selected state configuration.

In some embodiments of the method according to the first aspect of the present disclosure, the one or more predefined operating states comprises at least two of the following operating states: an ACTIVE state, an ECO state; an IDLE state; an enhanced IDLE state; and an enhanced ECO state.

In some embodiments of the method according to the first aspect of the present disclosure each candidate state configuration further indicates one or more valid state transition paths between the associated predefined operating states.

In some embodiments of the method according to the first aspect of the present disclosure the plurality of candidate state configurations comprises at least two of the following candidate state configurations:
a candidate state configuration associated with a set of predefined operating states that includes an ACTIVE state and an ECO state;
a candidate state configuration associated with a set of predefined operating states that includes an ECO state and an IDLE state;

a candidate state configuration associated with a set of predefined operating states that includes an ACTIVE state, an ECO state, and an IDLE state;

a candidate state configuration associated with a set of predefined operating states that includes an ACTIVE state and an IDLE state;

a candidate state configuration associated with a set of predefined operating states that includes an enhanced CONNECTED state and an IDLE state; and a candidate state configuration associated with a set of predefined operating states that includes an enhanced IDLE state and an ACTIVE state.

In some embodiments of the method according to the first aspect of the present disclosure the enhanced CONNECTED state includes therein ACTIVE and ECO sub-states with state transition paths therebetween within the enhanced CONNECTED state.

In some embodiments of the method according to the first aspect of the present disclosure the enhanced IDLE state includes therein IDLE and ECO sub-states with transition paths therebetween within the enhanced IDLE state.

In some embodiments of the method according to the first aspect of the present disclosure, the method further comprises communicating with the UE in accordance with the selected state configuration.

In some embodiments of the method according to the first aspect of the present disclosure the selected state configuration is associated with at least an energy-conserving operating state, the method further comprising:

maintaining UE context information for the UE in the energy-conserving operating state.

In some embodiments of the method according to the first aspect of the present disclosure, the method further comprises maintaining light connection management with the UE on at least one of uplink and downlink when the UE is operating in the first energy-conserving operating state.

In some embodiments of the method according to the first aspect of the present disclosure, the method further comprises receiving a grant-free uplink transmission from the UE when the UE is operating in the first energy-conserving operating state.

In some embodiments of the method according to the first aspect of the present disclosure, the method further comprises the network device performing location tracking of the UE when the UE is operating in the first energy-conserving operating state.

In some embodiments of the method according to the first aspect of the present disclosure, the method further comprises the selected state configuration further comprises an active operating state, and the method further comprises:

performing active connection management with the UE on uplink and downlink when the UE is operating in the active operating state.

In some embodiments of the method according to the first aspect of the present disclosure, the method further comprises:

the selected state configuration further comprises an enhanced CONNECTED operating state; and the active operating state and the first energy-conserving operating state are sub-states of the enhanced CONNECTED operating state.

In some embodiments of the method according to the first aspect of the present disclosure, the method further comprises:

the selected state configuration further comprises an enhanced IDLE operating state; and the first energy-conserving operating state and the second energy-conserving operating state are sub-states of the enhanced IDLE operating state.

A second aspect of the present disclosure provides a network device comprising:

a wireless interface;

a processor operatively coupled to the wireless interface; and a computer readable storage medium operatively coupled to the processor, the computer readable storage medium storing programming for execution by the processor, the programming comprising instructions to:

select, for a user equipment (UE), a state configuration from among a plurality of candidate state configurations, each candidate state configuration being associated with a respective one or more predefined operating states; and transmit, via the wireless interface, information to the UE regarding the selected state configuration.

In some embodiments of the method according to the second aspect of the present disclosure the instructions to select a state configuration comprise instructions to select a state configuration based at least in part on at least one of: a UE type associated with the UE; and one or more services supported by the UE.

In some embodiments of the method according to the second aspect of the present disclosure the programming further comprises instructions to receive, via the wireless interface, as part of a UE air interface capability exchange procedure, information regarding at least one of: the UE type associated with the UE; and the one or more services supported by the UE.

In some embodiments of the method according to the second aspect of the present disclosure the programming further comprises instructions to:

receive, via the wireless interface, as part of a UE supported service change procedure, information regarding a change to the one or more services supported by the UE;

responsive to receiving the information regarding the change to the one or more services supported by the UE, select a replacement state configuration from among the plurality of candidate state configurations based at least in part on the information regarding the change to the one or more services supported by the UE; and transmit, via the wireless interface, information to the UE regarding the selected replacement state configuration.

In some embodiments of the method according to the second aspect of the present disclosure:

the instructions to select a state configuration from among a plurality of candidate state configurations comprise instructions to:

select a first state configuration based at least in part on a first service supported by the UE; and select a second state configuration based at least in part on a second service supported by the UE; and the instructions to transmit, via the wireless interface, information to the UE regarding the selected state configuration comprise instructions to transmit, via the wireless interface, information to the UE regarding the selected first and second state configurations.

In some embodiments of the method according to the second aspect of the present disclosure the programming further comprises instructions to:

provide the first service in a first network slice in accordance with the first state configuration; and provide the second service in a second network slice in accordance with the second state configuration.

In some embodiments of the method according to the second aspect of the present disclosure:
the instructions to select a state configuration from among the plurality of candidate state configurations comprise instructions to select a state configuration for multiple network slices supported by the UE, each of the multiple network slices being associated with a respective state configuration among the plurality of candidate state configurations; and
the programming further comprises instructions to:
provide services to the UE in a first network slice of the multiple network slices supported by the UE in accordance with the selected state configuration; and
provide services to the UE in a second network slice of the multiple network slices supported by the UE in accordance with the selected state configuration.

In some embodiments of the method according to the second aspect of the present disclosure the one or more predefined operating states comprises at least two of the following operating states: an ACTIVE state, an ECO state; an IDLE state; an enhanced IDLE state; and an enhanced ECO state.

In some embodiments of the method according to the second aspect of the present disclosure each candidate state configuration further indicates one or more valid state transition paths between the associated predefined operating states.

In some embodiments of the method according to the second aspect of the present disclosure the plurality of candidate state configurations comprises at least two of the following candidate state configurations:
a candidate state configuration associated with a set of predefined operating states that includes an ACTIVE state and an ECO state;
a candidate state configuration associated with a set of predefined operating states that includes an ECO state and an IDLE state;
a candidate state configuration associated with a set of predefined operating states that includes an ACTIVE state, an ECO state, and an IDLE state;
a candidate state configuration associated with a set of predefined operating states that includes an ACTIVE state and an IDLE state;
a candidate state configuration associated with a set of predefined operating states that includes an enhanced CONNECTED state and an IDLE state; and
a candidate state configuration associated with a set of predefined operating states that includes an enhanced IDLE state and an ACTIVE state.

In some embodiments of the method according to the second aspect of the present disclosure the enhanced CONNECTED state includes therein ACTIVE and ECO sub-states with state transition paths therebetween within the enhanced CONNECTED state.

In some embodiments of the method according to the second aspect of the present disclosure the enhanced IDLE state includes therein IDLE and ECO sub-states with transition paths therebetween within the enhanced IDLE state.

In some embodiments of the method according to the second aspect of the present disclosure the programming further comprises instructions to communicate with the UE in accordance with the selected state configuration.

In some embodiments of the method according to the second aspect of the present disclosure the selected state configuration is associated with at least an energy-conserving operating state, the programming further comprises instructions to:
maintain UE context information for the UE in the energy-conserving operating state.

In some embodiments of the method according to the second aspect of the present disclosure, the programming further comprises instructions to maintain light connection management with the UE on at least one of uplink and downlink when the UE is operating in the first energy-conserving operating state.

In some embodiments of the method according to the second aspect of the present disclosure, the programming further comprises instructions to monitor for grant-free uplink transmission from the UE when the UE is operating in the first energy-conserving operating state.

In some embodiments of the method according to the second aspect of the present disclosure the programming further comprises instructions to perform a location tracking procedure for the UE when the UE is operating in the first energy-conserving operating state.

In some embodiments of the method according to the second aspect of the present disclosure:
the selected state configuration further comprises an active operating state; and
the programming further comprises instructions to perform active connection management with the UE on uplink and downlink when the UE is operating in the active operating state.

In some embodiments of the method according to the second aspect of the present disclosure:
the selected state configuration further comprises an enhanced CONNECTED operating state; and
the active operating state and the first energy-conserving operating state are sub-states of the enhanced CONNECTED operating state.

In some embodiments of the method according to the second aspect of the present disclosure:
the selected state configuration further comprises an enhanced IDLE operating state; and
the first energy-conserving operating state and the second energy-conserving operating state are sub-states of the enhanced IDLE operating state.

A third aspect of the present disclosure provides a method for supporting multiple UE state configurations in a wireless network, the method comprising:
receiving, by a user equipment (UE), from the wireless network, information regarding a state configuration selected for the UE, the selected state configuration having been selected from among a plurality of candidate state configurations, each candidate state configuration being associated with a respective one or more predefined operating states; and
communicating, by the UE, with the wireless network in accordance with the selected state configuration.

In some embodiments of the method according to the third aspect of the present disclosure, the method further comprises:
transmitting, by the UE, as part of a UE air interface capability exchange procedure, information regarding at least one of: a UE type associated with the UE; and one or more services supported by the UE,
wherein the state configuration selected for the UE is selected from among the plurality of candidate state configurations based at least in part on at least one of:
the information regarding the UE type associated with the UE; and the information regarding the one or more services supported by the UE.

In some embodiments of the method according to the third aspect of the present disclosure, the method further comprises:
transmitting, by the UE, as part of a UE supported service change procedure, information regarding a change to the one or more services supported by the UE;
receiving, by the UE, from the wireless network, information regarding a replacement state configuration selected for the UE from among the plurality of candidate state configurations based at least in part on the information regarding the change to the one or more services supported by the UE; and
communicating, by the UE, with the wireless network in accordance with the selected replacement state configuration.

In some embodiments of the method according to the third aspect of the present disclosure:
the UE supports multiple services, including at least a first service and a second service;
receiving, by the UE, from the wireless network, information regarding a state configuration selected for the UE comprises:
receiving, by the UE, information regarding a first state configuration selected from among the plurality of candidate state configurations based at least in part on the first service supported by the UE; and
receiving, by the UE, information regarding a second state configuration selected from among the plurality of candidate state configurations based at least in part on the second service supported by the UE; and
communicating, by the UE, with the wireless network in accordance with the selected state configuration comprises:
communicating, by the UE, with the wireless network in respect of the first service in accordance with the first selected state configuration; and
communicating, by the UE, with the wireless network in respect of the second service in accordance with the second selected state configuration.

In some embodiments of the method according to the third aspect of the present disclosure:
communicating with the wireless network in respect of the first service in accordance with the first selected state configuration comprises communicating with a first network slice of the wireless network in accordance with the first selected state configuration; and
communicating with the wireless network in respect of the second service in accordance with the second selected state configuration comprises communicating with a second network slice of the wireless network in accordance with the second selected state configuration.

In some embodiments of the method according to the third aspect of the present disclosure the selected state configuration is associated with at least an energy-conserving operating state in which UE context is maintained by the UE with the wireless network.

In some embodiments of the method according to the third aspect of the present disclosure each candidate state configuration further indicates one or more valid state transition paths between the associated predefined operating states.

In some embodiments of the method according to the third aspect of the present disclosure communicating with the wireless network in accordance with the selected state configuration comprises maintaining light connection management with the RAN on at least one of uplink and downlink when operating in the first energy-conserving operating state.

In some embodiments of the method according to the third aspect of the present disclosure maintaining light connection management with the RAN on at least one of uplink and downlink comprises maintaining light connection management on uplink and downlink when operating in the first energy-conserving operating state.

In some embodiments of the method according to the third aspect of the present disclosure communicating with the wireless network in accordance with the selected state configuration comprises configuring the UE for grant-free uplink transmission in the first energy-conserving operating state.

In some embodiments of the method according to the third aspect of the present disclosure communicating with the wireless network in accordance with the selected state configuration comprises configuring the UE with a tracking channel in the first energy-conserving operating state to facilitate periodic location tracking of the UE.

In some embodiments of the method according to the third aspect of the present disclosure the selected state configuration further comprises an active operating state in which the UE performs active connection management with the RAN on uplink and downlink.

In some embodiments of the method according to the third aspect of the present disclosure the selected state configuration includes a state transition path from the second energy-conserving operating state to the active operating state, but does not include a state transition path from the second energy-conserving operating state to the first energy-conserving operating state.

In some embodiments of the method according to the third aspect of the present disclosure transitioning between the first-energy conserving operating state and the active operating state is contention-free.

In some embodiments of the method according to the third aspect of the present disclosure:
the selected state configuration further comprises an enhanced CONNECTED operating state; and
the active operating state and the first energy-conserving operating state are sub-states of the enhanced CONNECTED operating state.

In some embodiments of the method according to the third aspect of the present disclosure transitions between the sub-states of the enhanced CONNECTED operating state are done without explicit state transition signalling to the wireless network.

In some embodiments of the method according to the third aspect of the present disclosure:
the selected state configuration further comprises an enhanced IDLE operating state; and
the first energy-conserving operating state and the second energy-conserving operating state are sub-states of the enhanced IDLE operating state.

In some embodiments of the method according to the third aspect of the present disclosure transitions between the sub-states of the enhanced IDLE operating state are done without explicit state transition signalling to the wireless network.

In some embodiments of the method according to the third aspect of the present disclosure, in the enhanced IDLE operating state, the UE is configured to operate in one of the sub-states of the enhanced IDLE operating state based on services supported by the UE and/or a UE type associated with the UE.

A fourth aspect of the present disclosure provides a user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions to:
receive, via the wireless interface, from a wireless network, information regarding a state configuration selected for the UE, the selected state configuration having been selected from among a plurality of candidate state configurations, each candidate state configuration being associated with a respective one or more predefined operating states; and
communicate with the wireless network in accordance with the selected state configuration.

In some embodiments of the UE according to the fourth aspect of the present disclosure the programming further comprises instructions to:
transmit, via the wireless interface, as part of a UE air interface capability exchange procedure, information regarding at least one of: a UE type associated with the UE; and one or more services supported by the UE,
wherein the state configuration selected for the UE is selected from among the plurality of candidate state configurations based at least in part on at least one of: the information regarding the UE type associated with the UE; and the information regarding the one or more services supported by the UE.

In some embodiments of the UE according to the fourth aspect of the present disclosure the programming further comprises instructions to:
transmit, via the wireless interface, as part of a UE supported service change procedure, information regarding a change to the one or more services supported by the UE;
receive, via the wireless interface, from the wireless network, information regarding a replacement state configuration selected for the UE from among the plurality of candidate state configurations based at least in part on the information regarding the change to the one or more services supported by the UE; and
communicate, via the wireless interface, with the wireless network in accordance with the selected replacement state configuration.

In some embodiments of the UE according to the fourth aspect of the present disclosure:
the UE supports multiple services, including at least a first service and a second service;
the instructions to receive, from the wireless network, information regarding a state configuration selected for the UE comprise instructions to:
receive information regarding a first state configuration selected from among the plurality of candidate state configurations based at least in part on the first service supported by the UE; and
receive information regarding a second state configuration selected from among the plurality of candidate state configurations based at least in part on the second service supported by the UE; and the instructions to communicate with the wireless network in accordance with the selected state configuration comprise instructions to:
communicate with the wireless network in respect of the first service in accordance with the first selected state configuration; and
communicate with the wireless network in respect of the second service in accordance with the second selected state configuration.

In some embodiments of the UE according to the fourth aspect of the present disclosure:
the instructions to communicate with the wireless network in respect of the first service in accordance with the first selected state configuration comprise instructions to communicate with a first network slice of the wireless network in accordance with the first selected state configuration; and
the instructions to communicate with the wireless network in respect of the second service in accordance with the second selected state configuration comprise instructions to communicate with a second network slice of the wireless network in accordance with the second selected state configuration.

In some embodiments of the UE according to the fourth aspect of the present disclosure the selected state configuration is associated with at least an energy-conserving operating state in which UE context is maintained by the UE with the wireless network.

In some embodiments of the UE according to the fourth aspect of the present disclosure each candidate state configuration further indicates one or more valid state transition paths between the associated predefined operating states.

In some embodiments of the UE according to the fourth aspect of the present disclosure the instructions to communicate with the wireless network in accordance with the selected state configuration comprise instructions to maintain light connection management with the wireless network on at least one of uplink and downlink when operating in the first energy-conserving operating state.

In some embodiments of the UE according to the fourth aspect of the present disclosure the UE is configured for grant-free uplink transmission in the first energy-conserving operating state.

In some embodiments of the UE according to the fourth aspect of the present disclosure the operating states of the state machine further comprise:
an active operating state in which the UE performs active connection management with the RAN on uplink and downlink.

In some embodiments of the UE according to the fourth aspect of the present disclosure transitioning between the first-energy conserving operating state and the active operating state is contention-free.

In some embodiments of the UE according to the fourth aspect of the present disclosure:
the operating states of the state machine further comprise an enhanced CONNECTED operating state; and
the active operating state and the first energy-conserving operating state are sub-states of the enhanced CONNECTED operating state.

In some embodiments of the UE according to the fourth aspect of the present disclosure transitions between the sub-states of the enhanced CONNECTED operating state are done without explicit state transition signalling to the RAN.

In some embodiments of the UE according to the fourth aspect of the present disclosure:

the operating states of the state machine further comprise an enhanced IDLE operating state; and the first energy-conserving operating state and the second energy-conserving operating state are sub-states of the enhanced IDLE operating state.

In some embodiments of the UE according to the fourth aspect of the present disclosure transitions between the sub-states of the enhanced IDLE operating state are done without explicit state transition signalling to the RAN.

In some embodiments of the UE according to the fourth aspect of the present disclosure, in the enhanced IDLE operating state, the UE is configured to operate in one of the sub-states of the enhanced IDLE operating state based on services supported by the UE and/or a UE type associated with the UE.

BRIEF DESCRIPTION OF THE DRAWINGS

Embodiments will now be described with reference to the attached drawings in which:

FIG. 4B illustrates further details of an enhanced IDLE state that is included in one of the example state configurations shown in FIG. 4A;

FIG. 4C illustrates further details of an enhanced CONNECTED state that is included in one of the example state configurations shown in FIG. 4A;

DETAILED DESCRIPTION OF EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

In designing mobile networks, an architecture has arisen in which the network can be divided into a Core Network (CN) and a Radio Access Network (RAN). The RAN provides wireless communication channels to User Equipment (UE), while the CN typically comprises nodes and functions making use of fixed links. In the RAN, fronthaul and backhaul connections often rely on wired connections, although some wireless connections (typically between fixed points) are present. The RAN has different requirements and issues to address than the CN.

Figure 1:
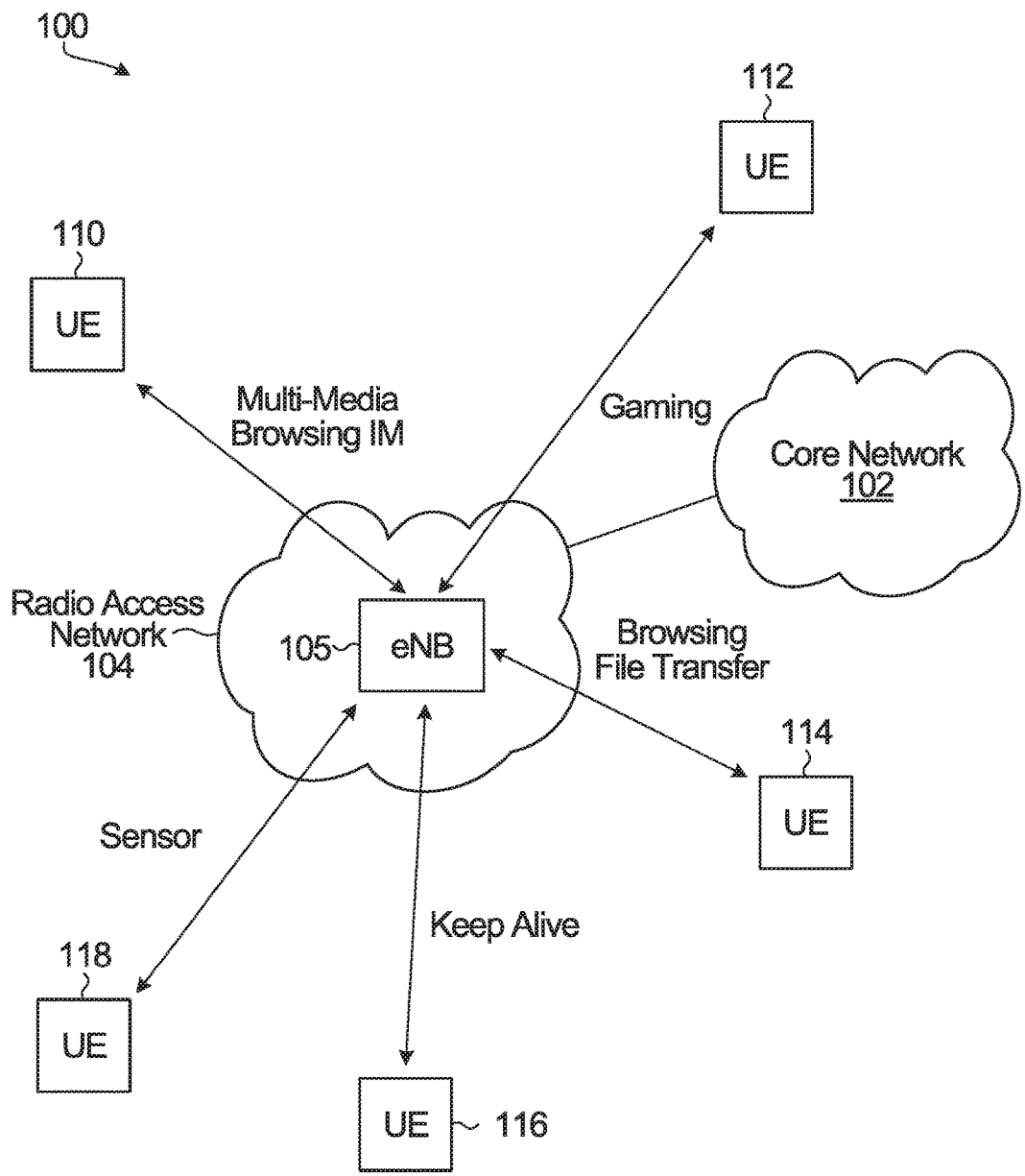
FIG. 1 illustrates an example communications system according to example embodiments described herein.

FIG. 1 illustrates an example communications system 100 that includes a Core Network (CN) 102 and a Radio Access Network (RAN) 104.

The CN 102 may provide any of various services, such as call control/switching and gateways to other networks. The CN 102 includes network components such as routers, switches, and servers.

An interface between the CN 102 and RAN 125 is provided to allow traffic from CN 102 to be directed towards mobile nodes, generally referred to as UEs, through Access Points (APs). In Third Generation and Fourth Generation (3G/4G) network architecture, a base station, base transceiver station, NodeB, and evolved NodeB (eNB) have been the terms used to refer to the wireless interface to the network. In the following, a generic Access Point is used to denote the wireless edge node of the network. An Access Point will be understood to be any of a Transmission Point (TP), a Receive Point (RP) and a Transmit/Receive Point (TRP). It will be understood that the term AP can be understood to include the above mentioned nodes, as well as their successor nodes, but is not necessarily restricted to them.

APs in RAN 104 may serve a plurality of UEs. For example, as shown in FIG. 1, RAN 104 includes an eNB 105 serving a plurality of UEs, including UE 110, UE 112, UE 114, UE 116, and UE 118. While it is understood that communications systems may employ multiple APs capable of communicating with a number of UEs, only one AP (eNB 105), and a number of UEs (UEs 110, 112, 114, 116 and 118) are illustrated for simplicity.

As noted above, in the present description access point (AP) is used to denote the wireless edge node of the network. Thus, the AP 105 provides the radio edge of RAN 104, which may for example be a Fifth Generation (5G) or New Radio (NR) wireless communication network. The UEs 110, 112, 114, 116 and 118 may receive communications from, and transmit communications to, the AP 105. Communications from the AP 105 to the UEs 110, 112, 114, 116 and 118 may be referred to as downlink (DL) communications, and communications from the UEs 110, 112, 114, 116 and 118 to the AP 105 may be referred to as uplink (UL) communications.

As discussed previously, as UEs become more advanced, they are capable of running a wider range of applications. The applications may be classified as either session based applications or non-session based applications. Session based applications are generally applications that utilize a series of data exchanges and have intolerance to large latencies, generate a lot of message traffic, have large data bandwidth requirements, and the like. For example, the session based applications may include video streaming, web browsing, file transfer, games, and the like. Non-session based applications are typically applications that utilize short data exchanges and some can tolerate large latencies, generate a small amount of message traffic, have small data bandwidth requirements, and the like. For example, the non-session based applications may include keep alive messages generated by a mobile operating system or instant messaging, reports generated by sensors and/or smart meters, and the like. However, it is understood that some non-session based applications may not be able to tolerate large latencies, such as some security sensor applications, health sensor applications, and the like.

As an illustrative example, UE 110 is running a multimedia streaming application, a web browser, as well as an instant messaging application, while UE 112 is running a multi-user video game. Similarly, UE 114 is running a web browser while performing a large file transfer, UE 116 is running an instant messaging application that is not active and is transmitting keep alive messages to maintain connectivity, while UE 118 is a sensor that reports on occasion.

In order to control UE usage of radio resources and power consumption, connection states are defined in many wireless communication standards (e.g. Long Term Evolution (LTE) Radio Resource Control (RRC) states, Universal Mobile Telecommunications System (UMTS) RRC states, Evolution Data Optimized (EVDO) connection states).

These states define the characteristics of a UE in terms of: resource usage (e.g. dedicated resources, shared resources), control channel usage and control channel monitoring pattern, and thus can affect one or more of the following metrics: terminal power consumption; network resources (e.g. physical resources, terminal ID allocation, and the like); data transmission latency; and control plane signaling overhead.

Many existing wireless communication standards include only two valid operational states. For example, the LTE/UMTS RRC states include an ACTIVE state and an IDLE state.

As an illustrative example, if a state machine includes two states: ACTIVE and IDLE with the IDLE state not allowing the UE to transmit, then a UE executing non-session based applications transitions to the ACTIVE state prior to transmitting or receiving transmissions (which, due to the nature of non-session based applications, occurs infrequently). The state transition generally requires the exchange of multiple messages between the UE and its AP, which incurs significant communications overhead and communications latency, especially when considering that the UE may be transmitting or receiving messages that are only a few bytes long (or less).

A third operational state, namely an ECO state, is proposed in U.S. patent application Ser. No. 14/150,539 filed on Jan. 8, 2014 entitled "System and Method for Always on Connections in Wireless Communications System", which is hereby incorporated by reference in its entirety. The ECO state may also be called Inactive state.

In the ECO state proposed in some embodiments of U.S. patent application Ser. No. 14/150,539, grant-free transmission is supported to reduce signalling overhead and energy consumption of transmission of small packets (e.g., background traffic).

In contrast to the conventional IDLE state defined in LTE/UMTS, an ECO state, such as the one proposed in some embodiments of U.S. patent application Ser. No. 14/150,539, allows UEs executing non-session based applications to communicate using background messages without having to change states from a first state that permits substantial energy consumption savings to a second state (e.g., the ACTIVE state) that results in greater energy consumption but generally has no restrictions on how the UE communicates.

In order to facilitate data transmission in ECO state, in some embodiments, UE context needs to be maintained with the Radio Access Network (RAN). For example, when a UE is operating in an ECO state, the UE and the RAN may maintain UE context information for the UE. The UE context, for example, may include a connection ID that identifies the UE (e.g. MAC ID, RNTI (radio network temporary identifier)), RRC connection information (e.g. configuration of radio bearers, logical channels, security), uplink reference signal configurations (e.g. for UL based measurement), MAC configurations (e.g. discontinuous reception (DRX) configurations), and physical channel configurations (e.g. configurations such as resources, modulation coding scheme (MCS) levels for grant-free data transmission), or subsets and variations thereof.

In some embodiments, the network has better knowledge of the UE location when the UE is in ECO state. For example, in ECO state, the UE location can be tracked within a smaller geographical area (e.g. within one NR cell, or several TRPs or beams within one NR cell) than the UE in IDLE state (e.g. a tracking area that consists of many NR cells).

Figure 2:
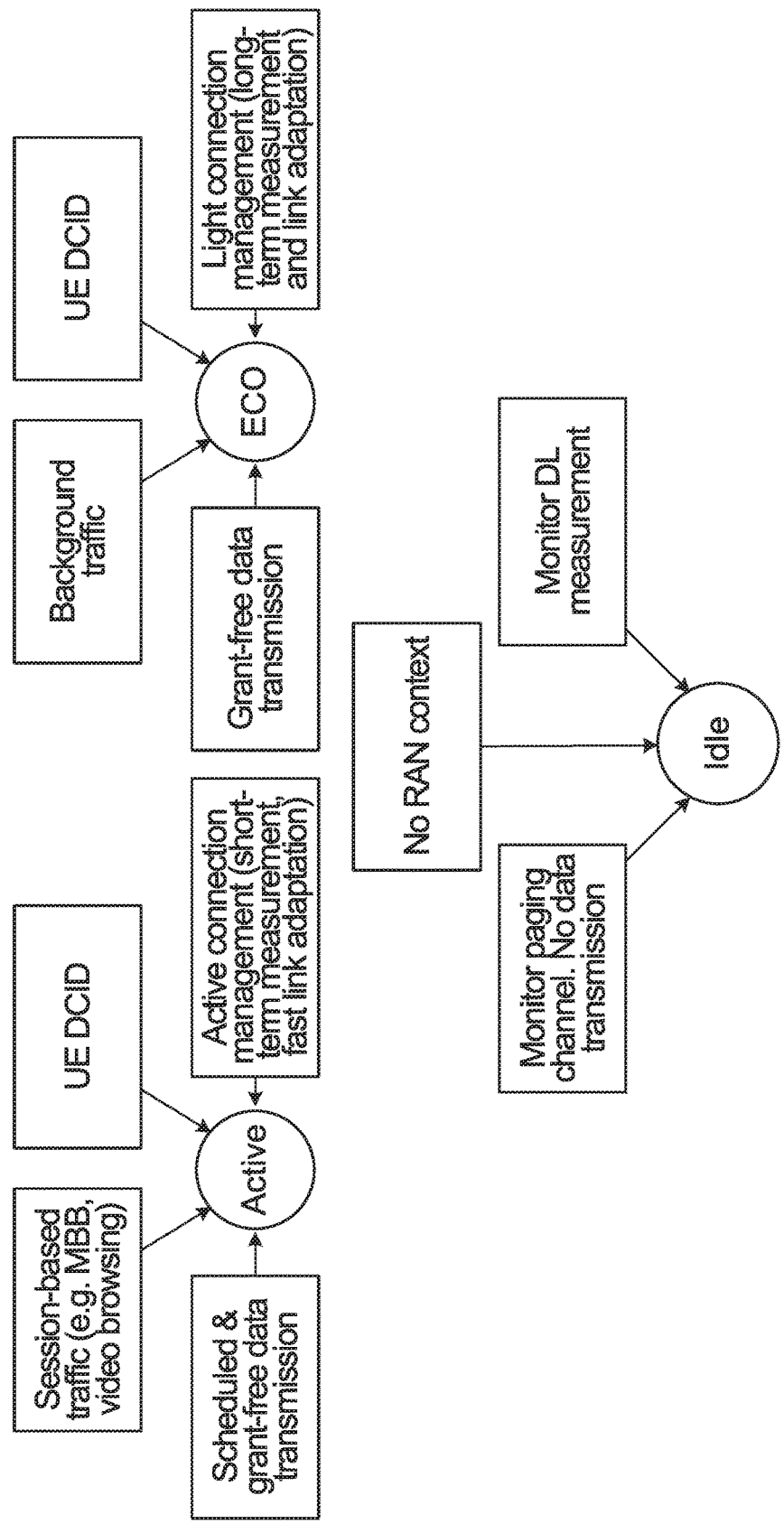
FIG. 2 illustrates examples of UE operational states according to example embodiments described herein.

FIG. 2 illustrates examples of operational characteristics that may be associated with an ACTIVE state, an ECO state, and an IDLE state according to example embodiments described herein. The example ACTIVE state illustrated in FIG. 3 features scheduled and grant-free data transmission for session-based traffic, active connection management, and the RAN maintains UE context information for the UE, such as a dedicated connection ID (DCID). The example ECO state illustrated in FIG. 3 features grant-free data transmission for background traffic, light connection management, and the RAN maintains UE context information for the UE, such as a DCID. Unlink the example ACTIVE and ECO states illustrated in FIG. 3, in the IDLE state illustrated in FIG. 3 the RAN does not maintain UE context information for the UE. In the example IDLE state illustrated in FIG. 3, a UE monitors downlink measurements and monitors a paging channel for paging messages, but does not transmit uplink data. The ECO and IDLE states are considered energy-conserving operating states relative to the ACTIVE state. It should be clear that these are merely examples of operational characteristics that may be associated with these operational states and one or more of the operational states may have different operational characteristics in other embodiments. In general, the operational states differ from one another in terms of network connectedness, which may affect terminal power consumption, network resources, data transmission latency, and/or control plane signaling overhead, as discussed above.

Figure 3:
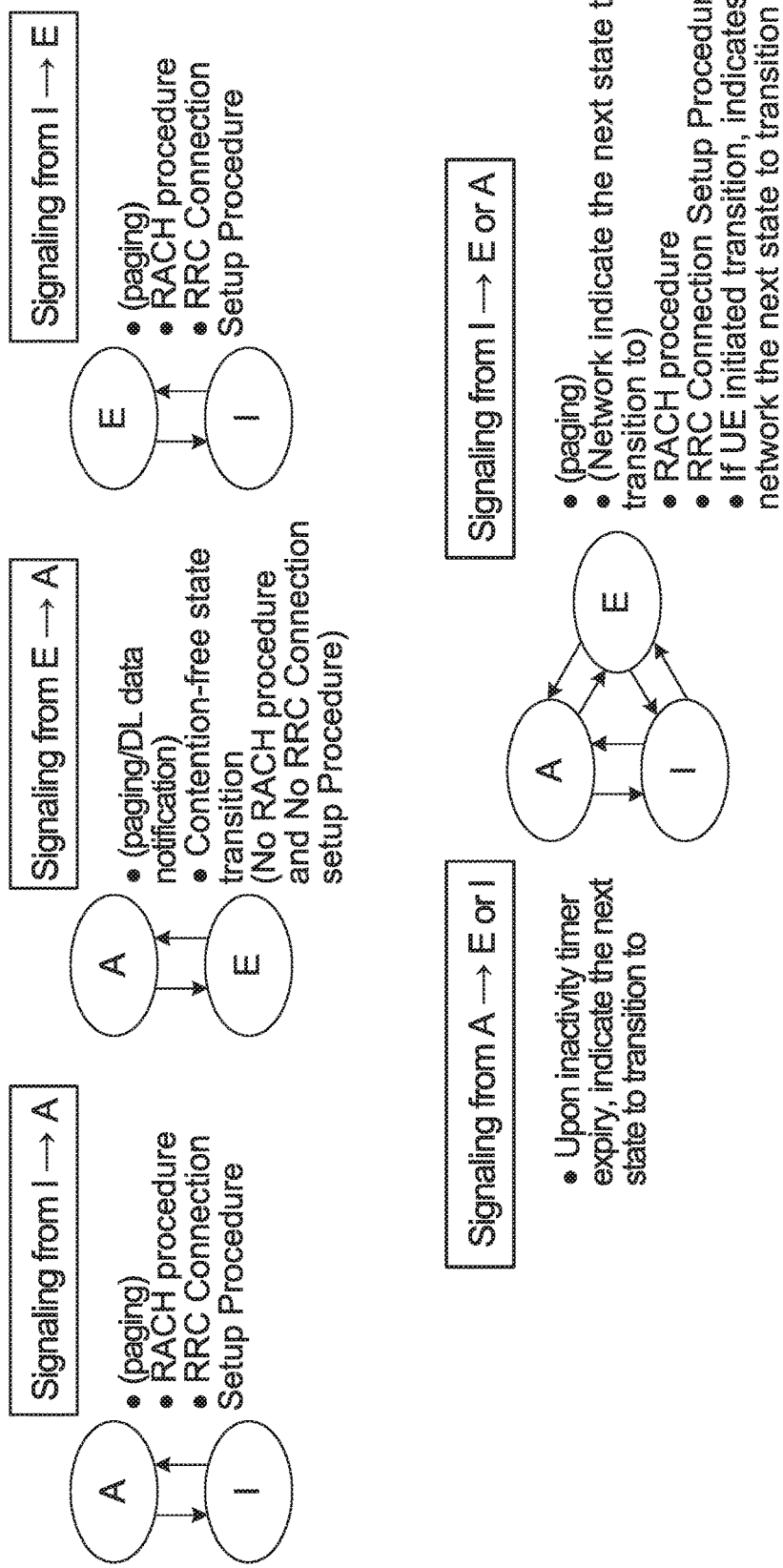
FIG. 3 illustrates examples of signalling overhead to support two states vs. three states according to example embodiments described herein.

However, as shown in FIG. 3, supporting state transitions among three potential operational states (e.g., between ACTIVE, ECO and IDLE states) may incur additional signalling overhead relative to only supporting state transitions among two potential operational states. FIG. 3 illustrates three examples of signalling overhead to support transitions between only two states vs. between three states, where ACTIVE, ECO and IDLE states are referenced using the letters A, E and I, respectively. Again, it should be noted that the examples of signalling shown in FIG. 3 are provided as illustrative examples only, and different signalling may be used in other implementations.

In the example with ACTIVE (A) and IDLE (I) states in FIG. 3, the signalling to transition from IDLE to ACTIVE includes the random access procedure (RACH procedure) and RRC connection setup procedure. This may be preceded by paging from the network.

In the example with ACTIVE (A) and ECO (E) states in FIG. 3, the signalling to transition from ECO to ACTIVE includes a contention-free state transition. For example, the UE may send a UE-dedicated preamble to the network without contention. Since UE context is maintained with the RAN in the ECO state in this example embodiment, there is no need to perform RRC connection setup procedure. The state transition from ECO to ACTIVE may be a result of the network sending paging and/or downlink data notification to the UE(s), for example.

In the example with ECO (E) and IDLE (I) states in FIG. 3, the signalling to transition from IDLE to ECO may include a RACH procedure and RRC connection setup procedure since UE context may not be maintained with the RAN in the IDLE state. This transition from IDLE to ECO may be preceded by the RAN sending a paging message to the UE, for example.

In all three of the above examples of FIG. 3, the transition from A to I, A to E or E to I may be the result of an inactivity timer expiry or in response to an explicit indication by the network to the UE, for example.

In the example with ACTIVE, ECO and IDLE states in FIG. 3, the signalling for state transition from IDLE to ECO or IDLE to Active may include a RACH procedure and a RRC connection setup procedure. Moreover, in some embodiments, an additional indication may be provided to indicate the next state a UE is transitioning to because there are more than two states. Similarly, the state transition from Active to ECO or Active to IDLE may also include additional signalling to indicate the next state a UE is transitioning to. In general, such additional signalling may be required if a UE transitions among more than two possible operating states.

While it may be advantageous for some UEs (e.g., smartphones capable of supporting a wide range of services) to support a larger number of operational states, some UEs (e.g., embedded sensor devices configured for machine type communication (MTC)) may not need to support state transitions among all the potential operational states.

Accordingly, for those UEs that may only need to support state transitions among a subset of all of the potential operational states, it may be desirable to configure those devices to avoid incurring the additional signalling overhead that may be associated with supporting transitions between all of the potential operational states.

One embodiment of the disclosure relates to supporting multiple UE state configurations in a wireless network so that the supported operational states of a UE are configurable. For example, in one embodiment the network selects a state configuration for each UE from among a pool of candidate state configurations with each candidate state configuration being associated with a respective set of one or more predefined operating states. For example, one candidate state configuration may include all potential operational states, while a second candidate state configuration may only include some subset of all potential operational states.

Figure 4A:
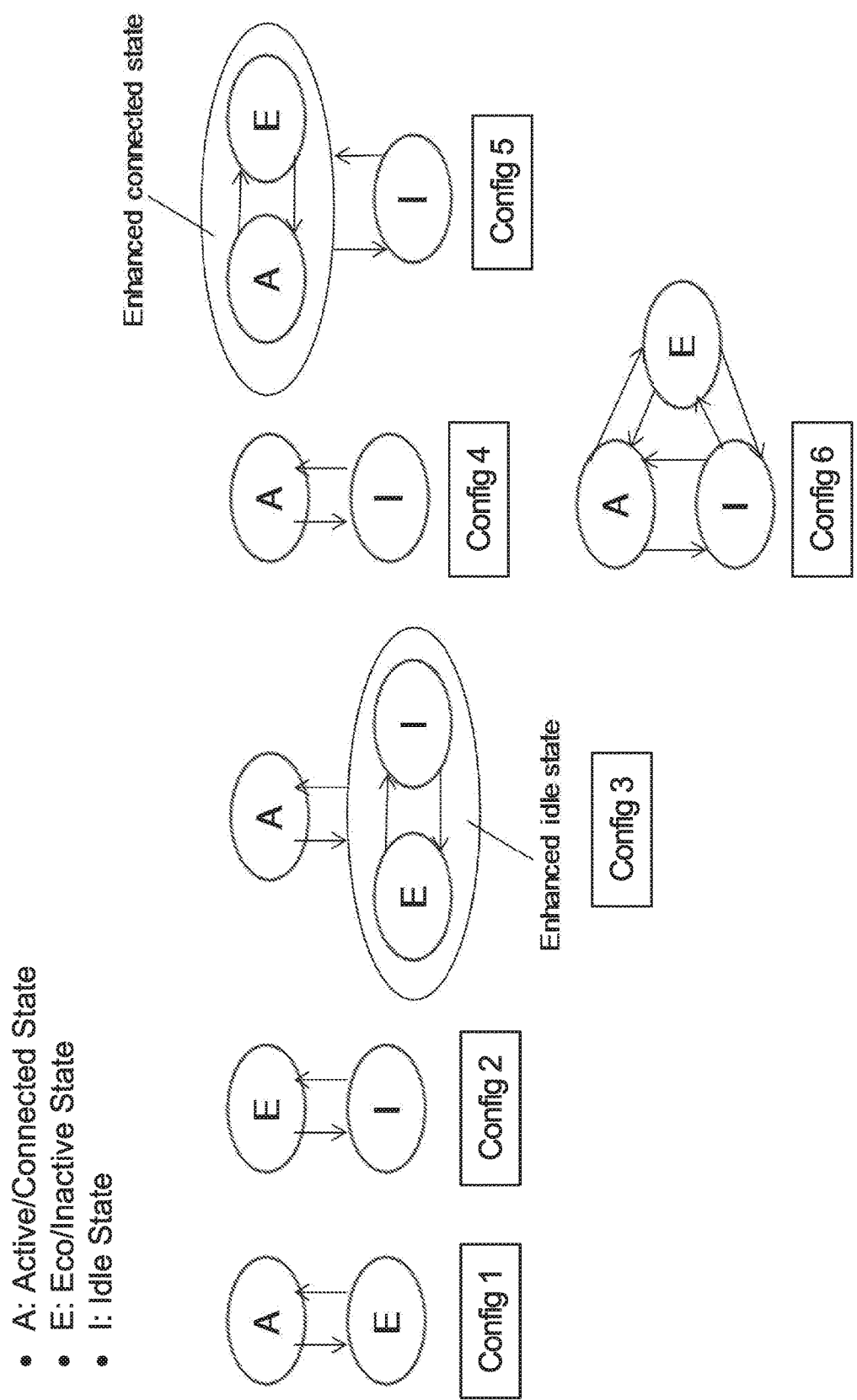
FIG. 4A illustrates examples of state configurations according to example embodiments described herein.

FIG. 4A illustrates six examples of state configurations according to example embodiments described herein. The illustrated examples include:

a first state configuration (Config 1) that includes an ACTIVE state and an ECO state;
a second state configuration (Config 2) that includes an ECO state and an IDLE state;
a third state configuration (Config 3) that includes an ACTIVE state and an enhanced IDLE state, where the enhanced IDLE state includes therein IDLE and ECO sub-states with transition paths therebetween within the enhanced IDLE state;
a fourth state configuration (Config 4) that includes an ACTIVE state and an IDLE state;
a fifth state configuration (Config 5) that includes an IDLE state and an enhanced CONNECTED state, where the enhanced CONNECTED state includes therein ACTIVE and ECO sub-states with transition paths therebetween within the enhanced CONNECTED state; and
a sixth state configuration (Config 6) that includes an ACTIVE state, an ECO state, and an IDLE state.

In an enhanced IDLE state shown in FIG. 4B, a UE can transition between an IDLE sub-state and an ECO sub-state. However, in some cases a UE can transition from the ECO sub-state to the IDLE sub-state, but must transition to the ACTIVE state (not shown in FIG. 4B) when seeking to re-establish a connection to the network, i.e, the direct transition from the IDLE sub-state to the ECO sub-state is not permitted in some cases. It should also be noted that the ECO and IDLE sub-states may not need to be explicitly defined in the enhanced IDLE state. They maybe implicitly specified by virtue of whether the associated procedures are supported and/or enabled as explained in the following. In some embodiments, the ECO sub-state is the same as the ECO state described earlier. For example, in some embodiments, while operating in the ECO sub-state the UE may maintain context information with the RAN and may be configured for grant-free uplink transmission. However, in order to further conserve battery power, a UE may go into deep sleep which is the IDLE sub-state. In another embodiment, the UE may not go into the IDLE sub-state.

In an ECO state/sub-state, the UE may be configured with a tracking channel such as the one proposed in U.S. Provisional Patent Application No. 62/141,483 filed Apr. 1, 2015 entitled "System and Method for a Tracking Channel" and U.S. patent application Ser. No. 15/009,626 filed Jan. 28, 2016 entitled "System and Method for a Tracking Channel", which are hereby incorporated by reference in their entireties. The tracking channel can be used by the network to track a UE location periodically and also to maintain a UE's uplink timing alignment. A UE can periodically monitor a simplified paging and downlink data notification message such as the one proposed in U.S. patent application Ser. No. 14/609,707 filed Jan. 30, 2015 entitled "Apparatus and Method for a Wireless Device to Receive Data in an ECO State", which is hereby incorporated by reference in its entirety. Such a message may be unicast to a UE. Maintaining a light connection management on the uplink and downlink may facilitate small packet data exchange with reduced latency while a UE is in an ECO state/sub-state. For example, the light connection management may include long-term adaptation of channel/link quality, predefined/slow selection of MCS, and infrequent UE feedback and UL reference signals transmission, or subsets and variations thereof.

On the other hand, in some embodiments, a UE can further reduce energy consumption by disabling the tracking channel procedure. In this case, the network does not actively track the UE. If a UE needs to send small packets on the uplink, the UE may re-enable the tracking channel procedure or it may perform a random access procedure. On the downlink, a UE may only periodically monitor for a paging message from the network. The paging message may be a multicast message to all UEs that belong to a paging group, for example. A paging procedure similar to that of LTE may be used in some embodiments.

A UE in the IDLE state/sub-state does not maintain context information with the network, which means that a UE in the IDLE state/sub-state typically incurs more delay in transmitting and receiving data, because it has to transition to a different state/sub-state and re-establish connection(s) with the network before transmitting/receiving data. In some embodiments, the transition between ECO and IDLE sub-states is without explicit state transition signalling. For example, in some embodiments only signalling associated with disabling and enabling a tracking procedure may be signaled.

Figure 4D:
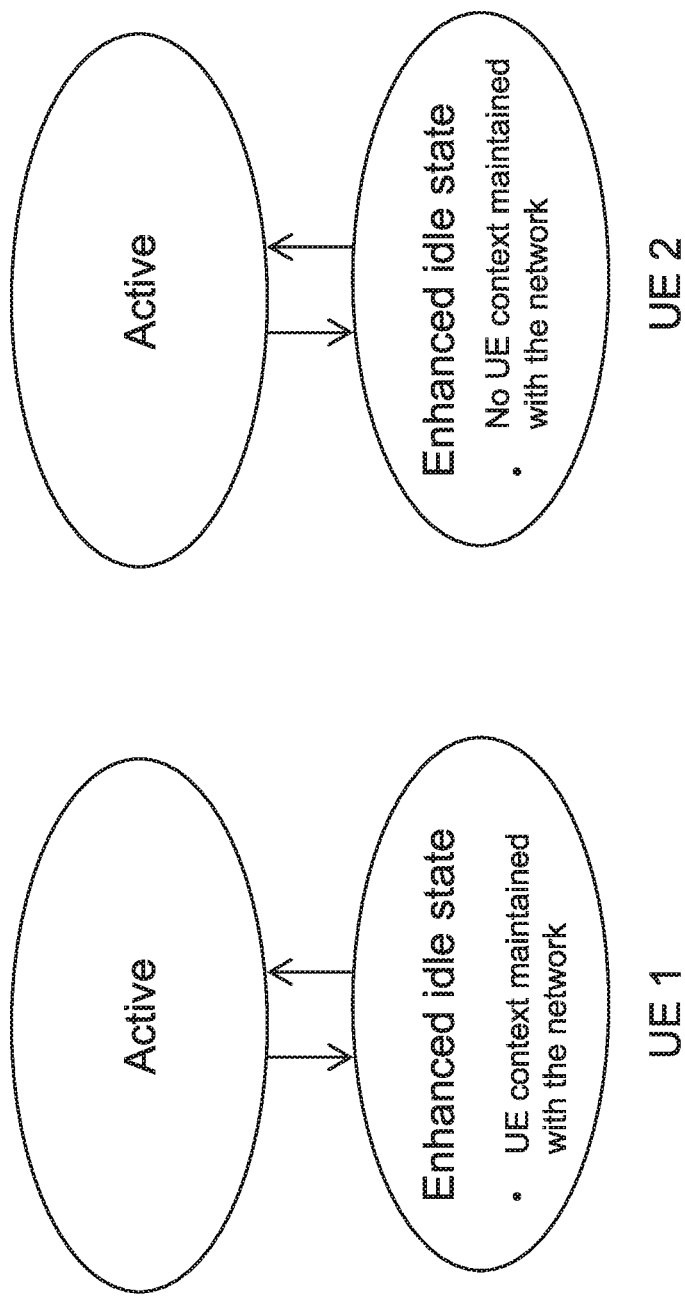
FIG. 4D illustrates further details of an enhanced IDLE state that is included in one of the example state configurations shown in FIG. 4A.

In some embodiments, the enhanced IDLE state can be configured by the network based on services and/or UE types as shown in FIG. 4D. That is, not all UEs need to support the procedures associated with the ECO sub-state. Some UEs, such as the example UE 1 on the left of FIG. 5D (e.g. legacy UEs, UEs that do not have delay sensitive traffic, UEs that require more battery saving) may only support the IDLE sub-state in the enhanced IDLE state. Some other UEs, such as the example UE 2 on the right of FIG. 5D (e.g. UEs with delay sensitive traffic, UEs that are not battery power limited) may support both ECO and IDLE sub-states in the enhanced IDLE state. For the UEs that support the procedures associated with the ECO sub-state, UE context is maintained with the RAN to allow for fast transition (e.g., contention-free transition) to the ACTIVE state. The state transition between the ACTIVE state and enhanced IDLE state may be similar to that of transition between the ACTIVE state and ECO state as shown in FIG. 3. For UEs that do not support procedures associated with the ECO sub-state or such procedures are disabled, UE context with the RAN is released in the enhanced IDLE state, which is similar to what occurs during the transition between the ACTIVE state and IDLE state as shown in FIG. 3.

In some embodiments, in an enhanced CONNECTED state as shown in FIG. 4C, a UE can transition between an ACTIVE sub-state and an ECO sub-state. A UE is in the ECO sub-state may enable a tracking procedure and may disable an uplink sounding procedure. In some embodiments, the UE may be configured for grant-free uplink transmission in the ECO sub-state, in which case the UE may stop monitoring dynamic signalling resource allocation for uplink grant. The UE may also stop monitoring downlink scheduling assignments in the ECO sub-state. In some embodiments, a UE in the IDLE state (not shown in FIG. 4C) may be able to transition to either the ACTIVE sub-state or the ECO sub-state of the enhanced CONNECTED state. In other embodiments, a UE in the IDLE state may only be able to transition to the ACTIVE sub-state in order to re-establish a connection to the network, e.g., to send and/or receive data, i.e., a UE may be able to transition from the ECO sub-state to the IDLE state, but may not be permitted to transition directly from the IDLE state to the ECO sub-state.

The six example state configurations shown in FIG. 4A are merely illustrative examples. Other permutations and combinations of ACTIVE, ECO, and IDLE states, and enhanced versions thereof may be used in other candidate state configurations in some embodiments of the present disclosure. For example, a further state configuration may include the ACTIVE, ECO and IDLE states, similar to the sixth state configuration shown in FIG. 6, but may differ therefrom in that it omits one or more transition paths between the operational states. For example, the transition path from IDLE to ECO may be omitted. It is understood that in some embodiments any other transition path may be omitted. As such, it should be noted that a state configuration may not only define a set of one or more operational states, but may also define valid transition paths between its constituent operational states. However, the valid transition paths may not be defined if every operational state in a state configuration can be transitioned to every other operational state in the state configuration.

By defining such a pool of candidate state configurations and assigning a UE a candidate state configuration that includes only those operational states that the UE requires, additional signalling overhead that would otherwise be incurred to support operational states that are not utilized by the UE. Accordingly, the selection of a state configuration for a given UE may be based on different UE-specific factors that may include a UE type associated with the UE and/or one or more services supported by the UE. As such, different UEs may have different state configurations.

As noted above, in some embodiments, one of the factors upon which the selection of a state configuration for a given UE may be based is the category or type of the UE. For example, UEs may be categorized or typed according to some criteria. These categories or types may include a first category or type for UEs configured for machine type communication (MTC), for example. The first category or type may be associated/mapped to state configurations that include only two operational states (e.g., Config 2 and/or Config 1). A second category or type may be for more capable devices, such as smartphones, for example. The second category or type may be associated/mapped to state configurations that include three operational states (e.g., Config 6). A third category or type may be defined for backward compatibility with the operational states defined in an earlier wireless communication system standard (e.g., Config 4, where the ACTIVE and IDLE states are defined according to the RRC states in LTE/UMTS, for example). Information regarding the UE type may be exchanged with the network as part of an initial network access procedure, for example.

In some embodiments, another factor upon which the selection of a state configuration for a given UE may be based is the service(s) that the UE supports. For example, an enhanced mobile broadband (eMBB) service may be mapped to a state configuration that includes ACTIVE, ECO and IDLE states with transition paths between each of those states (Config 6, for example). Therefore, the state configuration that the eMBB service is mapped to may be selected for a UE that supports the eMBB service.

In some cases, a UE may support a number of different services that may be mapped to different state configurations that include different permutations and combinations of operational states. As such, in some cases a UE that supports multiple services may be assigned multiple state configurations from the pool of candidate state configurations.

In some cases, a network may be built in a flexible way so that speed, capacity and coverage can be allocated in logical network "slices" to meet the specific demands of different services/traffic types. For example, a network slice may be configured to support the communication service of a particular connection type with a specific way of handling the control plane and user plane for the communication service. To this end, a network slice may be composed of a collection of network functions and specific radio access technology (RAT) settings that are combined together for a specific use case. Thus, a network slice may span all domains of the network: software modules running on cloud nodes, specific configurations of the transport network supporting flexible location of functions, a dedicated radio configuration or even a specific RAT, as well as configuration of UEs. Not all network slices contain the same functions. For example, a network slice may be configured to provide only the traffic treatment that is necessary for a particular use case, and avoid all other unnecessary functionality. As an example of a network slice, it can contain a portion of the time-frequency resources in frequency partition in the physical layer, some resources (e.g. computing and processing power) of one or more TRPs in the network are allocated to a network slice. In another example of a network slice, the same time-frequency resources, one or more TRPs can be shared among the different slices at different time.

In some embodiments, the services supported by a UE may be supported through different network slices. From the network point of view, a UE supporting a particular service belonging to a network slice may be associated with a particular state configuration. In other words, there may be a mapping between network slices and state configurations.

Figure 5B:
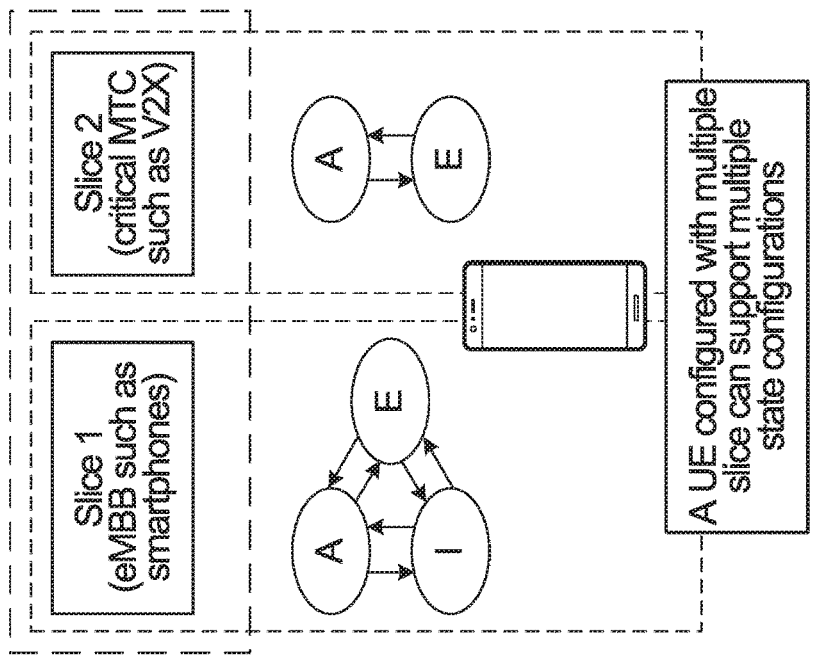
FIG. 5B illustrates an example of a UE configured with multiple state configurations according to example embodiments described herein.
Figure 5A:
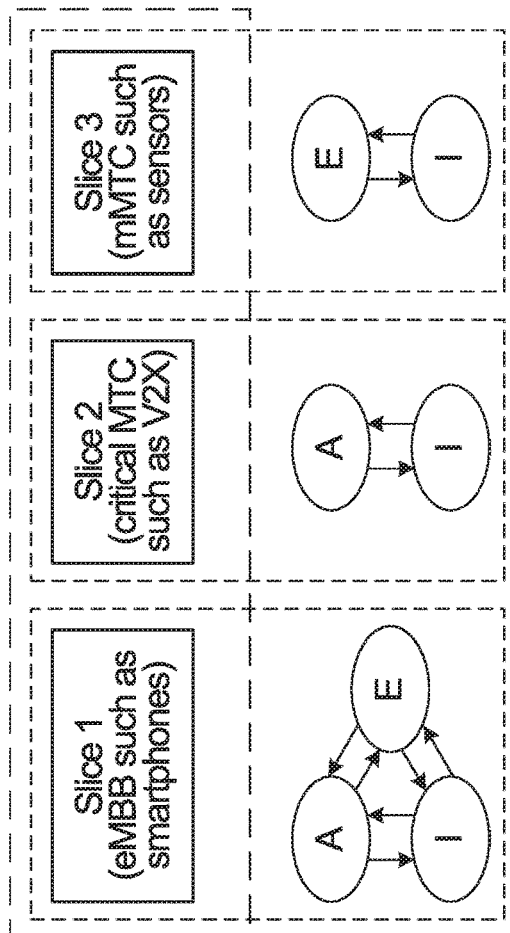
FIG. 5A illustrates examples of mappings between network slices and state configurations according to example embodiments described herein.

FIG. 5A illustrates examples of mappings between network slices and state configurations according to example embodiments described herein. The illustrated examples include three network slices. The first network slice supports an eMBB service and is mapped to a state configuration that includes ACTIVE, ECO and IDLE states with transition paths between each of those states (Config 6, for example). The second network slice supports ultra-reliable low latency communication (URLLC), such as vehicle-to-anything (V2X) communication, and is mapped to a state configuration that includes ACTIVE and ECO states (Config 1, for example) for always-on connectivity with low latency grant-free transmission on uplink (UL) small packets and scheduled transmission on downlink (DL) for large packets. The third network slice supports massive machine type communication (mMTC), such as embedded sensor communication, and is mapped to a state configuration that includes ECO and IDLE states (Config 2, for example) for energy savings and to support a massive connection of small packets with grant-free transmission.

In some embodiments, a UE supporting multiple network slices (e.g., a UE supporting a first service in a first network slice and a second service in a second network slice, for example) may be configured with multiple state configurations and may support a service within a given network slice according to its respective state configuration. FIG. 5B illustrates an example of a UE configured with multiple state configurations according to example embodiments described herein. In the illustrated example, the UE is configured to support services in two network slices corresponding to the first and second network slices illustrated in FIG. 5A and is configured with the two corresponding state configurations (Configs 6 and 1, for example).

However, in some embodiments, a UE supporting multiple network slices may be configured with a single state configuration that includes all of the predefined operating states associated with the respective state configurations associated with the multiple network slices supported by the UE. For example, with reference to FIGS. 4 and 5A, a UE that supports an eMBB service in the first network slice and a critical MTC service in the second network slice may be configured with Config 6, as Config 6 accommodates all of the operational states (and transition paths) of the state configurations with which the first and second network slices are associated. In other words, because the state configuration that is associated with the first network slice, namely {ACTIVE, ECO, IDLE} includes all of the operational states that are associated with state configuration that is associated with the second network slice, namely {ACTIVE, ECO}, the state configuration that is associated with the first network slice may also be used for the second network slice.

In some cases a network slice may be mapped to a frequency sub-band. In such cases, different state configurations may therefore be configured on different sub-bands. As a result, control channels may be configured accordingly (e.g. periodicity of monitoring and transmission. Feedback report and tracking channel on uplink, monitoring of paging and downlink control channels on the downlink). That is, a UE may be in ECO state in one sub-band and ACTIVE state in another sub-band.

Information regarding the service(s) that are supported by a UE may be exchanged with the network as part of an initial network access procedure and/or as part of a UE supported service change procedure in which the UE provides the network with information regarding a change to one or more services supported by the UE. As such, it is noted that a change to the service(s) supported by a UE may result in the selection of a different state configuration for the UE. Therefore, it will be appreciated that the selection of one or more state configurations for a UE may be done statically and/or may change over time (semi-static) based on the supported services/traffic types.

Figure 6A:
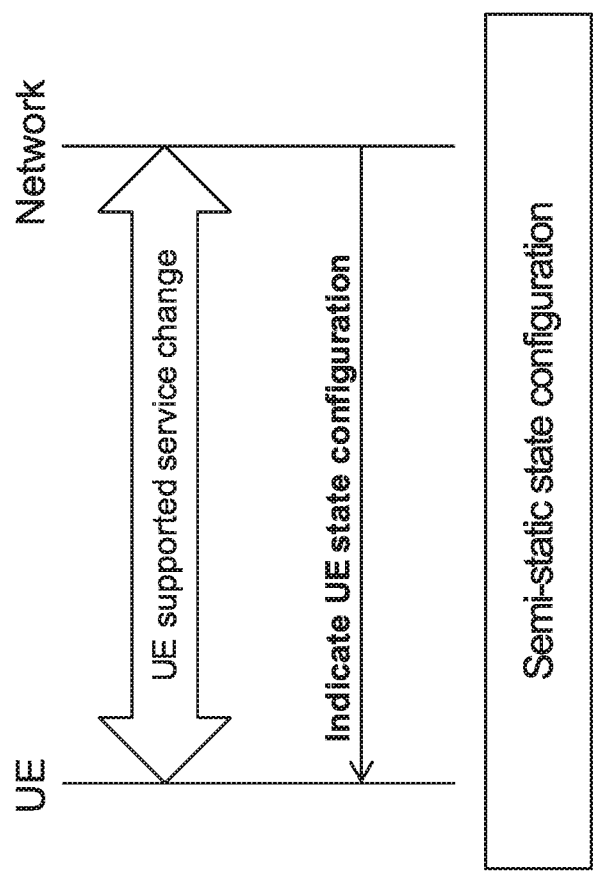
FIGS. 6A and 6B illustrate example message exchange diagrams according to example embodiments described herein.
Figure 6B:
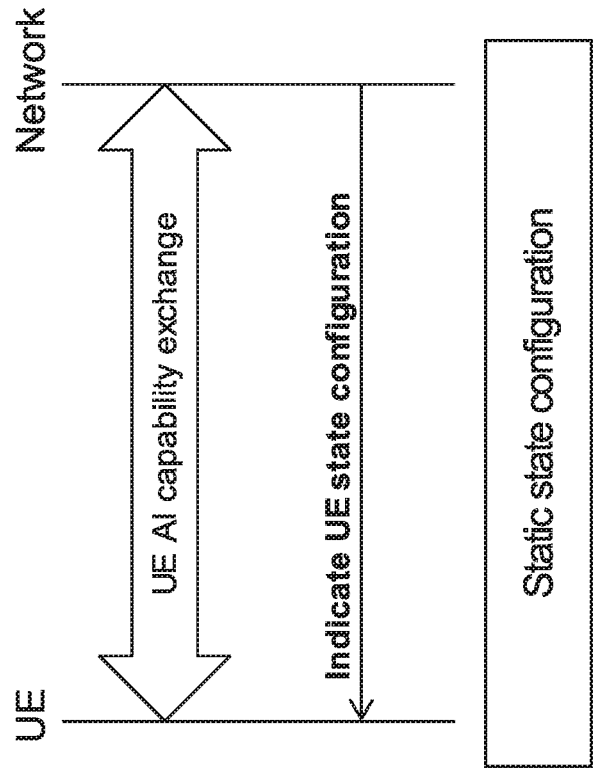

FIGS. 6A and 6B illustrate example message exchange diagrams between a UE and a network device according to example embodiments described herein. The network device, for example, includes a TRP or controller.

FIG. 6A illustrates a message exchange diagram between a UE and a network device for a static state configuration. Information regarding the UE type associated with the UE and/or service(s) supported by the device are exchanged with the network as part of a UE air interface (AI) capability exchange procedure. The UE AI capability exchange procedure may occur when the UE initially attempts to access the network. The procedure is a higher layer (e.g. RRC) procedure. In the procedure, a UE may send its UE air interface capability information to the network in response to the UE air interface capability enquiry message. In another example, the UE AI capability exchange procedure is part of the UE capability exchange procedure. In this regard, the AI capability information may be included in one or more information element(s) (IEs) of the message of the UE capability exchange procedure. The network device selects a state configuration for the UE according to example embodiments described herein and transmits information to the UE regarding the selected state configuration. For example, the network device may select the state configuration based at least in part on the information that it received as part of the UE AI capability exchange procedure (e.g., information regarding a UE type associated with the UE and/or information regarding one or more services supported by the UE). The information regarding the selected state configuration may be broadcast in a broadcast message, multicast in a multicast message, or unicast to the particular UE in a unicast message.

FIG. 6B illustrates a message exchange diagram between a UE and a network device for a semi-static state configuration. Information regarding a change to one or more services supported by the UE is exchanged with the network as part of a UE supported service change procedure. This procedure may involve UE sending of a message containing a change in the service to the network. This message can include the new service type (e.g. eMBB, mMTC, URLLC). Responsive to receiving the information regarding the change to the one or more services supported by the UE, the network device selects a replacement state configuration from among the plurality of candidate state configurations based at least in part on the information regarding the change to the one or more services supported by the UE. The network device then transmits information to the UE regarding the selected replacement state configuration. In some cases, the change to the one or more services supported by the UE may not necessitate a change to the state configuration(s) selected for the UE. As such, in some cases a selected replacement state configuration may be the same as a previously selected state configuration for the UE. The information regarding the selected state configuration may be broadcast in a broadcast message, multicast in a multicast message, or unicast to the particular UE in a unicast message.

In another embodiment, if there is a predefined mapping of UE state configurations to services and/or UE types, the UE state configuration may be implicitly indicated without explicit signalling. For example, after information regarding the UE type associated with the UE and/or service(s) supported by the device are exchanged with the network as part of a UE air interface (AI) capability exchange procedure, the UE state configuration(s) may then be determined by the UE based on the predefined mapping. In another example, after information regarding a change to one or more services supported by the UE is exchanged with the network as part of a UE supported service change procedure, the UE state configuration(s) may then be determined by the UE based on the predefined mapping.

Figure 7:
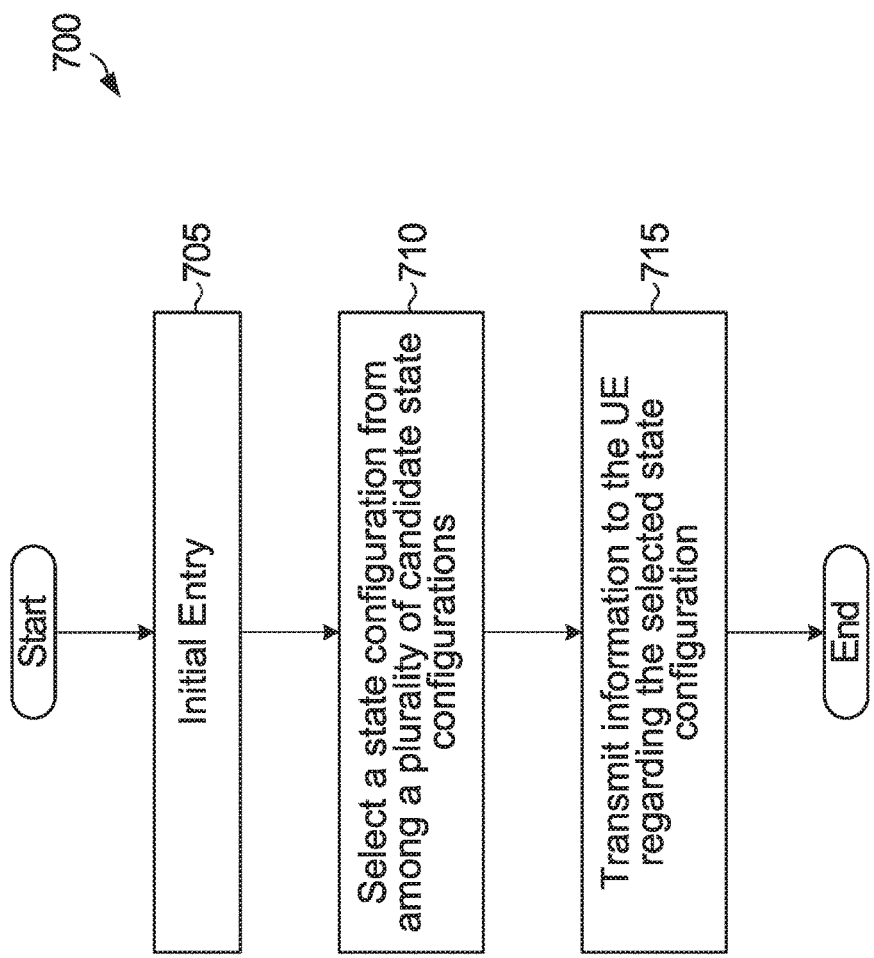
FIG. 7 illustrates a flow diagram of example operations in a network device according to example embodiments described herein.

FIG. 7 illustrates a flow diagram of example operations 700 in a network device according to example embodiments described herein. Operations 700 may be indicative of operations occurring in a network device such as an eNB, a picocell or the like.

Operations 700 may begin with a UE performing initial entry with the network (block 705). The UE may be a smartphone, a sensor, a personal computer, a tablet or the like. As discussed previously, the network device may select a state configuration for the UE from among a plurality of candidate state configurations (block 710). Each candidate state configuration may be associated with a respective set of one or more predefined operating states from among a plurality of predefined operating states. The network device may transmit information to the UE regarding the selected state configuration (block 715).

The example operations 700 are illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some embodiments, selecting a state configuration at block 710 includes selecting a state configuration based at least in part on a UE type associated with the UE and/or one or more services supported by the UE. For example, as part of initial entry at block 705 or sometime thereafter, the UE may provide the network with information regarding a UE type associated with the UE and/or information regarding one or more services supported by the UE, which the network device may use to select a state configuration at block 710.

In some embodiments, information regarding a change to the one or more services supported by the UE may be received as part of a UE supported service change procedure. Responsive to receiving such information, the network device may select a replacement state configuration and transmit information to the UE regarding the selected replacement state configuration, as discussed previously with reference to FIG. 6B.

In some embodiments, selecting a state configuration at block 715 includes selecting a first state configuration based at least in part on a first service supported by the UE and selecting a second state configuration based at least in part on a second service supported by the UE. Similarly, transmitting information regarding the selected state configuration to the UE at block 715 may include transmitting information regarding the selected first and second state configurations. In such cases, the operations 700 may further include providing the first service in a first network slice in accordance with the first state configuration and providing the second service in a second network slice in accordance with the second state configuration.

In some embodiments, each of a plurality of network slice may be associated with a respective state configuration, and selecting a state configuration at block 710 may involve selecting a state configuration for multiple network slices supported by the UE, where the selected state configuration includes all of the predefined operating states associated with the respective state configurations associated with the multiple network slices supported by the UE. In such embodiments, operations 700 may further include providing services to the UE in the multiple network slices supported by the UE in accordance with the selected state configuration.

Figure 8:
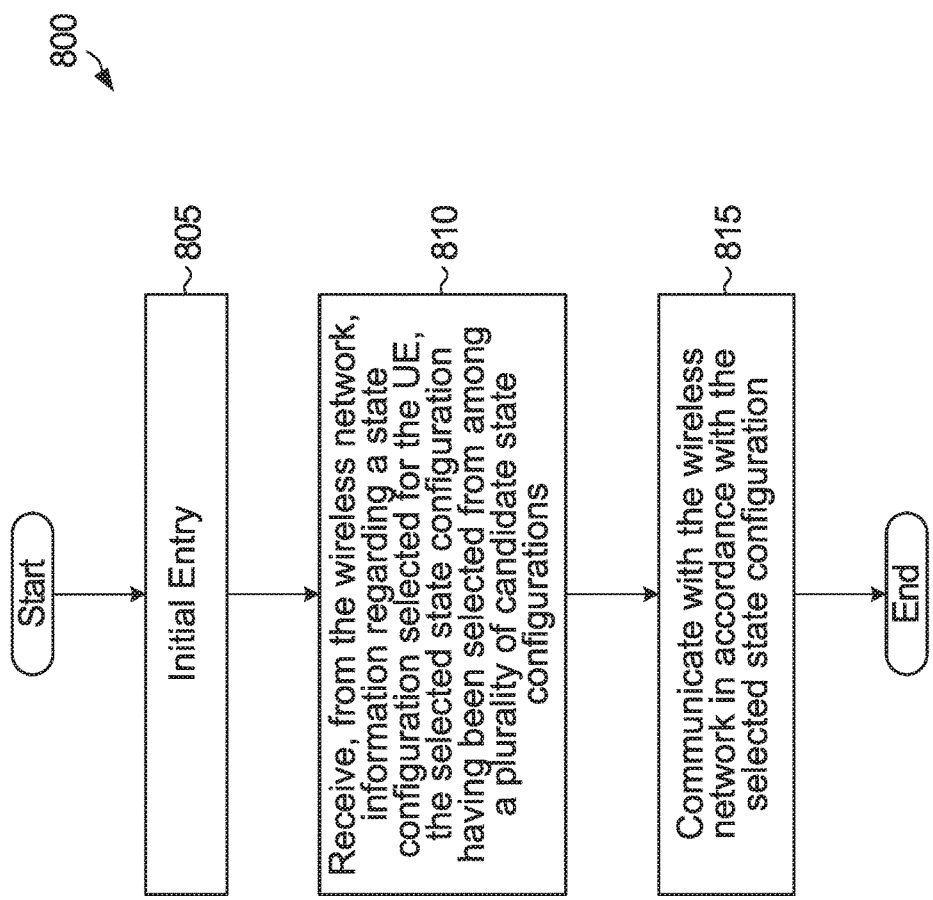
FIG. 8 illustrates a flow diagram of example operations in a UE according to example embodiments described herein.

FIG. 8 illustrates a flow diagram of example operations 800 in a UE according to example embodiments described herein. Operations 800 may be indicative of operations in a UE such as a smartphone, a sensor, a personal computer, a tablet or the like.

Operations 800 may begin with the UE performing initial entry with a wireless network (block 805). For example, the UE may perform initial entry with a network device such as an eNB, a picocell, or the like. As discussed previously, the UE may receive, from the wireless network, information regarding a state configuration selected for the UE from among a plurality of candidate state configurations (block 810). Each candidate state configuration may be associated with a respective set of one or more predefined operating states from among a plurality of predefined operating states. The UE may communicate with the wireless network in accordance with the selected state configuration (block 815). For example, the UE may use the information regarding the selected state configuration to configure a state machine in the UE.

The example operations 800 are illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

For example, in some embodiments the initial entry procedure at block 805 involves a UE air interface capability exchange procedure that involves transmitting information to the wireless network regarding a UE type associated with the UE and/or one or more services supported by the UE.

In some embodiments, operations 800 may further include transmitting, as part of a UE supported service change procedure, information regarding a change to the one or more services supported by the UE, and then subsequently receiving information regarding a replacement state configuration selected for the UE based at least in part on the information regarding the change to the one or more services supported by the UE. The UE may then communicate with the wireless network in accordance with the selected replacement state configuration.

In some embodiments, the UE may support multiple services, including at least a first service and a second service. In such embodiments, receiving information regarding a state configuration selected for the UE at block 810 may include receiving a first state configuration selected based at least in part on the first service supported by the UE and receiving a second state configuration selected from among the plurality of candidate state configurations based at least in part on the second service supported by the UE. Communicating with the wireless network in accordance with the selected state configuration at block 815 may then include communicating with the wireless network in respect of the first service in accordance with the first selected state configuration and communicating with the wireless network in respect of the second service in accordance with the second selected state configuration.

In some embodiments, the first and second services may be supported by first and second network slices respectively. As such, in some embodiments, communicating with the wireless network in respect of the first and second service in accordance with the first and second selected state configuration may include communicating with first and second network slice of the wireless network in accordance with the first and second selected state configurations.

In some embodiments, the first and second network slices may be allocated to a first and second time-frequency resources (e.g. sub-bands). As such, in some embodiments, communicating with the wireless network in accordance with the first and second selected state configuration may include communicating with first and second time-frequency resources.

Figure 9:
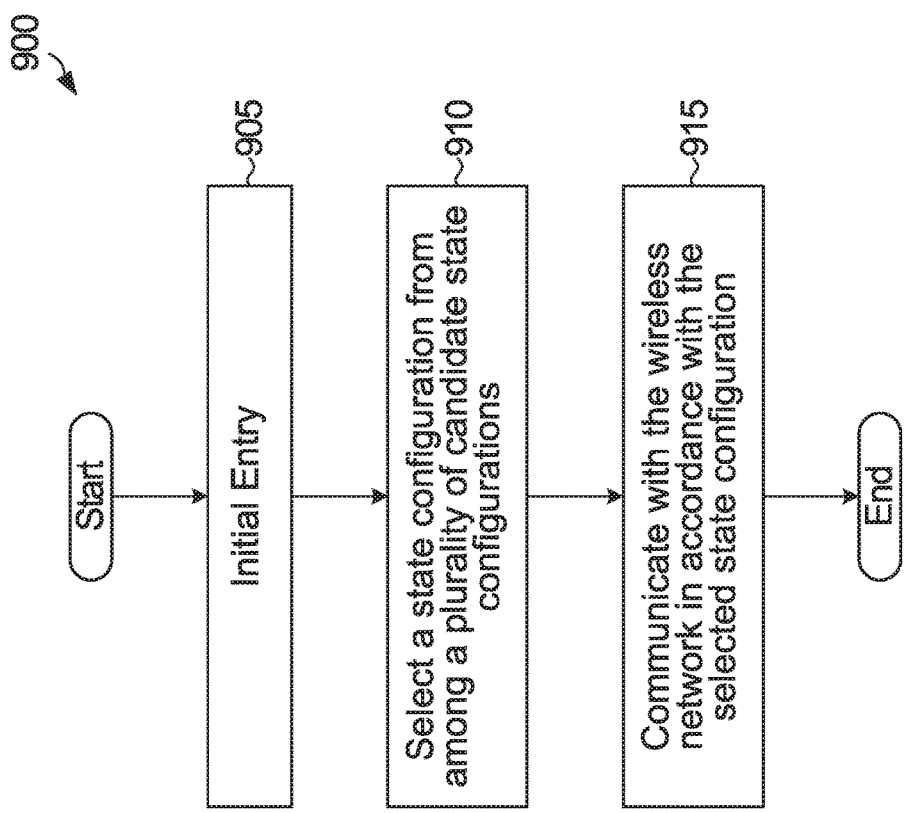
FIG. 9 illustrates a flow diagram of example operations in a UE according to example embodiments described herein.

FIG. 9 illustrates a flow diagram of example operations 900 in a UE according to example embodiments described herein. Operations 900 may be indicative of operations in a UE such as a smartphone, a sensor, a personal computer, a tablet or the like.

Operations 900 may begin with the UE performing initial entry with a wireless network (block 905). For example, the UE may perform initial entry with a network device such as an eNB, a picocell, or the like. As discussed previously, the UE may select a state configuration from among a plurality of candidate state configurations (block 910). Each candidate state configuration may be associated with a respective one or more predefined operating states. The UE may communicate with the wireless network in accordance with the selected state configuration (block 915). For example, the UE may use the information regarding the selected state configuration to configure a state machine in the UE.

The example operations 900 are illustrative of an example embodiment. In other embodiments, similar or different operations could be performed in a similar or different order and/or certain operations may be omitted. Various ways to perform the illustrated operations, as well as examples of other operations that may be performed, are described herein. Further variations may be or become apparent.

Figure 10:
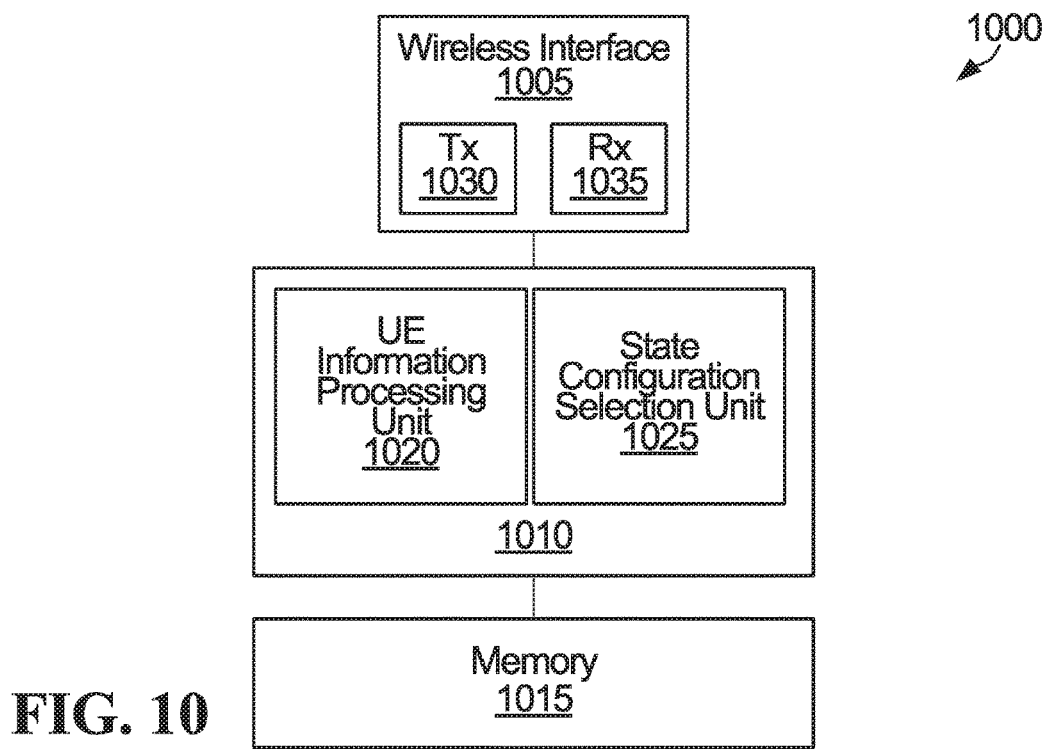
FIG. 10 illustrates a block diagram of an example network device according to example embodiments described herein.

FIG. 10 illustrates a block diagram of an example communication device 1000 according to example embodiments described herein. Communication device 1000 may be an implementation of a network device, such as a eNB, a picocell or the like. Communication device 1000 may be used to implement various ones of the embodiments discussed herein.

As shown in FIG. 10, communication device 1000 includes a wireless interface 1005. Wireless interface 1005 includes a transmitter 1030 configured to send messages, and the like, and a receiver 1035 configured to receive messages, and the like.

A UE information processing unit 1020 is configured to receive, via wireless interface 1005, information regarding a UE type associated with a UE and/or information regarding one or more services supported by the UE. For example, UE information processing unit 1020 may be configured to perform the actions of the network device according to the UE air interface capability exchange procedure illustrated in FIG. 6A. UE information processing unit 1020 could, for example, include a microprocessor, microcontroller, digital signal processor, field programmable gate array, or application specific integrated circuit.

A state configuration selection unit 1025 is configured to select, for the UE, a state configuration from among a plurality of candidate state configurations as described herein. Each candidate state configuration may be associated with a respective set of one or more predefined operating states from among a plurality of predefined operating states. The state configuration selection unit 1025 is further configured to transmit, via wireless interface 1005, information to the UE regarding the selected state configuration. State configuration selection unit 1025 could, for example, include a microprocessor, microcontroller, digital signal processor, field programmable gate array, or application specific integrated circuit.

In some embodiments, state configuration selection unit 1025 is configured to select a state configuration based at least in part on the information received by UE information processing unit 1020 regarding the UE type associated with the UE and/or one or more services supported by the UE.

In some embodiments, UE information processing unit 1020 may be further configured to receive, via wireless interface 1005, information from the UE regarding a change to the one or more services supported by the UE. This information may be received as part of a UE supported service change procedure, for example. State configuration selection unit 1025 may be further configured to select a replacement state configuration for the UE responsive to UE information processing unit 1020 having received such information. State configuration selection unit 1025 may be further configured to transmit, via wireless interface 1005, information to the UE regarding the selected replacement state configuration, as discussed previously with reference to FIG. 6B.

In some embodiments, state configuration selection unit 1025 is configured to select a first state configuration based at least in part on a first service supported by the UE and select a second state configuration based at least in part on a second service supported by the UE. Similarly, state configuration selection unit 1025 may be further configured to transmit information regarding the selected first and second state configurations to the UE via wireless interface 1005. In such embodiments, the network device 1000 may be configured to provide the first service in a first network slice in accordance with the first state configuration and to provide the second service in a second network slice in accordance with the second state configuration.

In some embodiments, each of a plurality of network slice may be associated with a respective state configuration, and state configuration selection unit 1025 may be configured to select a state configuration for multiple network slices supported by the UE, where the selected state configuration includes all of the predefined operating states associated with the respective state configurations associated with the multiple network slices supported by the UE. In such embodiments, the network device 1000 may be configured to provide services to the UE in the multiple network slices supported by the UE in accordance with the selected state configuration.

A memory 1015 is configured to store information regarding predefined operating states, candidate state configurations, selected state configurations, UE types, supported services, detected signals, decoded signals, and the like.

The elements of communication device 1000 may be implemented as specific hardware logic blocks. In an alternative, the elements of communication device 1000 may be implemented as software executing in a processor, controller, application specific integrated circuit, or so on. In yet another alternative, the elements of communication device 1000 may be implemented as a combination of software and/or hardware.

As an example, transmitter 1030 and receiver 1035 may be implemented as a specific hardware block, while UE information processing unit 1020 and state configuration selection unit 1025 may be software modules executing in a processor 1010, such as a microprocessor, a digital signal processor, a custom circuit, or a custom compiled logic array of a field programmable logic array. UE information processing unit 1020 and state configuration selection unit 1025 may be modules stored in memory 1015.

Figure 11:
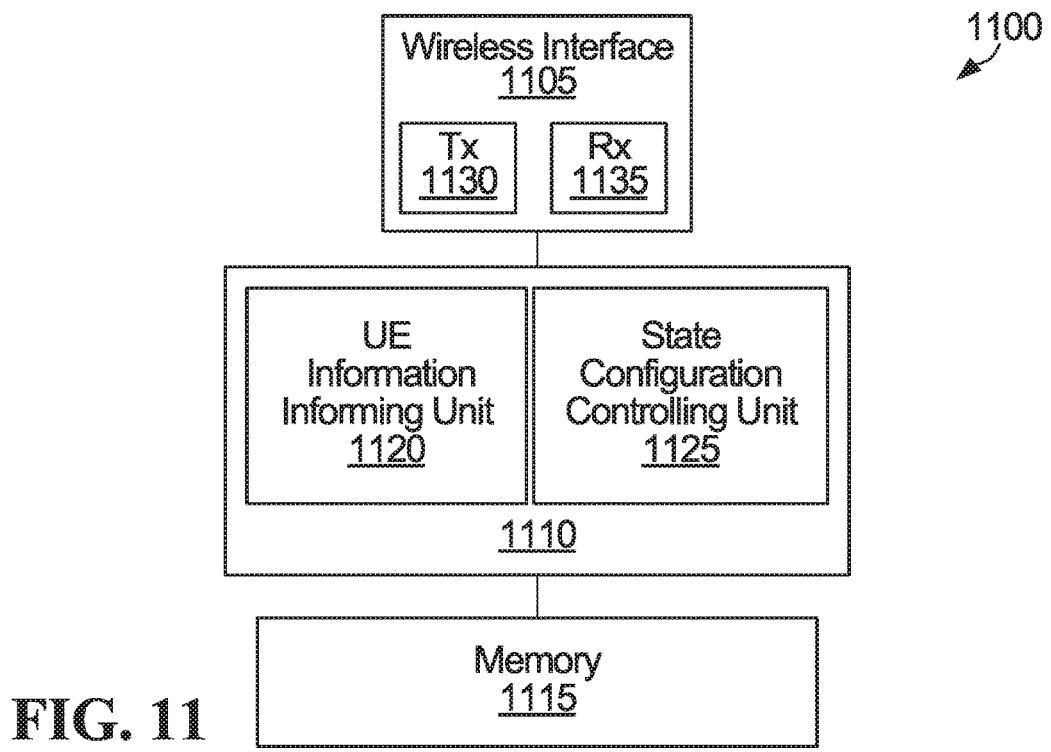
FIG. 11 illustrates a block diagram of a UE according to example embodiments described herein.

FIG. 11 illustrates a block diagram of an example communication device 1100 according to example embodiments described herein. Communication device 1100 may be an implementation of a UE, such as a smartphone, a sensor, a PC, a tablet or the like. Communication device 1100 may be used to implement various ones of the embodiments discussed herein.

As shown in FIG. 11, communication device 1100 includes a wireless interface 1105. Wireless interface 1105 includes a transmitter 1130 configured to send messages, and the like, and a receiver 1135 configured to receive messages, and the like.

A UE information informing unit 1120 is configured to transmit, via wireless interface 1105, information regarding a UE type associated with the UE and/or information regarding one or more services supported by the UE. For example, UE information informing unit 1120 may be configured to perform the actions of the UE according to the UE air interface capability exchange procedure illustrated in FIG. 6A. UE information informing unit 1120 could, for example, include a microprocessor, microcontroller, digital signal processor, field programmable gate array, or application specific integrated circuit.

A state configuration controlling unit 1125 is configured to receive, via wireless interface 1105, information regarding a state configuration selected for the UE from among a plurality of candidate state configurations as described herein. Each candidate state configuration may be associated with a respective set of one or more predefined operating states from among a plurality of predefined operating states. The state configuration controlling unit 1125 is further configured to control the UE 1100 to facilitate communication via the wireless interface 1105 in accordance with the selected state configuration. For example, the state configuration controlling unit 1125 may use the information regarding the selected state configuration to configure a state machine. State configuration controlling unit 1125 could, for example, include a microprocessor, microcontroller, digital signal processor, field programmable gate array, or application specific integrated circuit.

In some embodiments, UE information informing unit 1120 is further configured to transmit, via wireless interface 1105, information regarding a change to one or more services supported by the UE. For example, UE information informing unit 1120 may be configured to perform the actions of the UE according to the UE supported service change procedure illustrated in FIG. 6B. In such embodiments, state configuration controlling unit 1125 may be further configured to receive, via wireless interface 1105, information regarding a replacement state configuration selected for the UE based at least in part on the information regarding the change to the one or more services supported by the UE. The state configuration controlling unit 1125 may then control the UE 1100 to facilitate communication via the wireless interface 1105 in accordance with the selected replacement state configuration.

In some embodiments, the UE 1100 may support multiple services, including at least a first service and a second service. In such embodiments, state configuration controlling unit 1125 may be configured to receive first and second state configurations in respect of the first and second services and control the UE 1100 to facilitate communication via the wireless interface 1105 in respect of the first and second services in accordance with the first and second selected state configurations.

In some embodiments, the first and second services may be supported by first and second network slices respectively. As such, in some embodiments, state configuration controlling unit 1125 may be configured to control the UE 1100 to facilitate communication via the wireless interface 1105 through the first and second network slice in accordance with the first and second selected state configurations.

A memory 1115 is configured to store information regarding the predefined operating states, candidate state configurations, selected state configurations, the device's UE type, supported services, detected signals, decoded signals, and the like.

The elements of communication device 1100 may be implemented as specific hardware logic blocks. In an alternative, the elements of communication device 1100 may be implemented as software executing in a processor, controller, application specific integrated circuit, or so on. In yet another alternative, the elements of communication device 1100 may be implemented as a combination of software and/or hardware.

As an example, transmitter 1130 and receiver 1135 may be implemented as a specific hardware block, while UE information informing unit 1120 and state configuration controlling unit 1125 may be software modules executing in a processor 1110, such as a microprocessor, a digital signal processor, a custom circuit, or a custom compiled logic array of a field programmable logic array. UE information informing unit 1120 and state configuration controlling unit 1125 may be modules stored in memory 1115.

Figure 12:
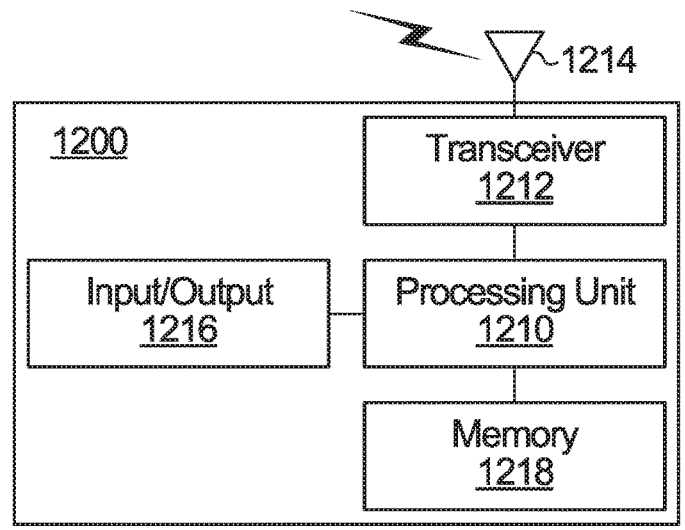
FIG. 12 illustrates an example UE according to example embodiments described herein.
Figure 13:
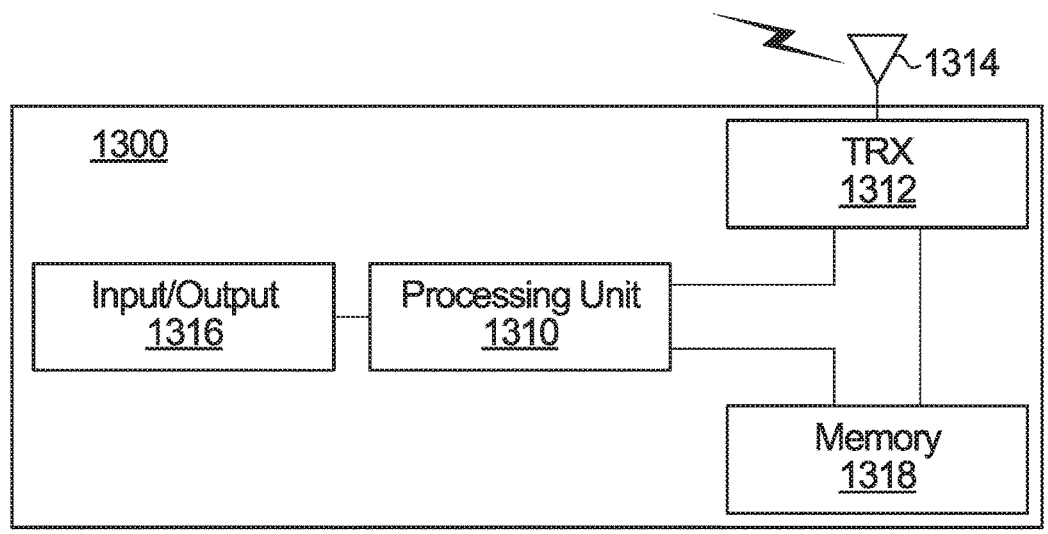
FIG. 13 illustrates an example network device according to example embodiments described herein.

FIGS. 12 and 13 illustrate example devices that may implement the methods and teachings according to this disclosure. In particular, FIG. 12 illustrates an example UE 1200, and FIG. 13 illustrates an example network device 1300. These components could be used in the system 100 shown in FIG. 1 or in any other suitable system.

As shown in FIG. 12, the UE 1200 includes at least one processing unit 1210. The processing unit 1210 implements various processing operations of the UE 1200. For example, the processing unit 1210 is configured to perform the UE functions and/or operations according to the embodiments described herein. In addition, the processing unit 1210 may also be configured to perform signal coding, data processing, power control, input/output processing, or any other functionality enabling the UE 1200 to operate in the system 100. Each processing unit 1210 includes any suitable processing or computing device configured to perform one or more of the UE functions/operations. Each processing unit 1210 could, for example, include a microprocessor, microcontroller, digital signal processor, field programmable gate array, or application specific integrated circuit.

The UE 1200 also includes at least one transceiver 1212. The transceiver 1212 is configured to modulate data or other content for transmission by at least one antenna or NIC (Network Interface Controller) 1214. The transceiver 1212 is also configured to demodulate data or other content received by the at least one antenna 1214. Each transceiver 1212 includes any suitable structure for generating signals for wireless or wired transmission and/or processing signals received wirelessly or by wire. Each antenna 1214 includes any suitable structure for transmitting and/or receiving wireless or wired signals. One or multiple transceivers 1212 could be used in the UE 1200, and one or multiple antennas 1214 could be used in the UE 1200. Although shown as a single functional unit, a transceiver 1212 could also be implemented using at least one transmitter and at least one separate receiver.

The UE 1200 further includes one or more input/output devices 1216 or interfaces (such as a wired interface to the internet 150). The input/output devices 1216 facilitate interaction with a user or other devices (network communications) in the network. Each input/output device 1216 includes any suitable structure for providing information to or receiving/providing information from a user, such as a speaker, microphone, keypad, keyboard, display, or touch screen, including network interface communications.

In addition, the UE 1200 includes at least one memory 1218. The memory 1218 stores instructions and data used, generated, or collected by the UE 1200. For example, the memory 1218 could store software or firmware instructions which, when executed by the processing unit(s) 1210, cause the processing unit(s) 1210 to perform the UE functions and/or operations according to the embodiments described herein. Each memory 1218 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. In other implementations, the processing unit(s) 1210 and memory 1218 form circuitry which is configured to perform the UE functions and/or operations according to the embodiments described herein.

As shown in FIG. 13, the network device 1300 includes at least one processing unit 1310, at least one transceiver 1312, which includes functionality for a transmitter and a receiver, one or more antennas 1314, at least one memory 1318, and one or more input/output devices or interfaces 1316. The processing unit 1310 is configured to perform the network device functions and/or operations according to the embodiments described herein. In addition, the processing unit 1310 may also be configured to perform various other processing operations of the network device 1300, such as signal coding, data processing, power control, input/output processing, or any other functionality necessary to provide network access to the UE 1200 or enable the UE 1200 to operate in the system 100. Each processing unit 1310 includes any suitable processing or computing device configured to perform one or more operations. Each processing unit 1310 could, for example, include a microprocessor, microcontroller, digital signal processor, field programmable gate array, or application specific integrated circuit.

Each transceiver 1312 includes any suitable structure for generating signals for wireless or wired transmission to one or more UEs or other devices. Each transceiver 1312 further includes any suitable structure for processing signals received wirelessly or by wire from one or more UEs or other devices. Although shown combined as a transceiver 1312, a transmitter and a receiver could be separate components. Each antenna 1314 includes any suitable structure for transmitting and/or receiving wireless or wired signals. While a common antenna 1314 is shown here as being coupled to the transceiver 1312, one or more antennas 1314 could be coupled to the transceiver(s) 1312, allowing separate antennas 1314 to be coupled to the transmitter and the receiver if equipped as separate components. Each memory 1318 includes any suitable volatile and/or non-volatile storage and retrieval device(s). Each input/output device 1316 facilitates interaction with a user or other devices (network communications) in the network. Each input/output device 1316 includes any suitable structure for providing information to or receiving/providing information from a user, including network interface communications.

EXAMPLE EMBODIMENTS

The following provides a non-limiting list of example embodiments of the present disclosure:

Example Embodiment 1

A method for supporting multiple user equipment (UE) state configurations in a wireless network, the method comprising:
selecting, by a UE, a state configuration from among a plurality of candidate state configurations, each candidate state configuration being associated with a respective set of one or more predefined operating states; and
communicating, by the UE, with the wireless network in accordance with the selected state configuration.

Example Embodiment 2

The method of Example embodiment 1, further comprising:
wherein the state configuration selected by the UE is selected from among the plurality of candidate state configurations based at least in part on at least one of: a UE type associated with the UE; and one or more services supported by the UE.

Example Embodiment 3

The method of Example embodiment 2, further comprising:
selecting, by the UE, a replacement state configuration from among the plurality of candidate state configurations based at least in part on the change to the one or more services supported by the UE; and
communicating, by the UE, with the wireless network in accordance with the selected replacement state configuration.

Example Embodiment 4

The method of any of Example embodiments 1 to 3, wherein:

the UE supports multiple services, including at least a first service and a second service;
selecting, by the UE, a state configuration from among the plurality of candidate state configurations comprises:
selecting, by the UE, a first state configuration selected from among the plurality of candidate state configurations based at least in part on the first service supported by the UE; and
selecting, by the UE, a second state configuration from among the plurality of candidate state configurations based at least in part on the second service supported by the UE; and
communicating, by the UE, with the wireless network in accordance with the selected state configuration comprises:
communicating, by the UE, with the wireless network in respect of the first service in accordance with the first selected state configuration; and
communicating, by the UE, with the wireless network in respect of the second service in accordance with the second selected state configuration.

Example Embodiment 5

The method of any of Example embodiments 1 to 4, wherein:
communicating with the wireless network in respect of the first service in accordance with the first selected state configuration comprises communicating with a first network slice of the wireless network in accordance with the first selected state configuration; and
communicating with the wireless network in respect of the second service in accordance with the second selected state configuration comprises communicating with a second network slice of the wireless network in accordance with the second selected state configuration.

Example Embodiment 6

The method of any of Example embodiments 1 to 5, wherein the selected state configuration comprises at least:
a first energy-conserving operating state in which UE context with a radio access network (RAN) is maintained by the UE; and
a second energy-conserving operating state in which no UE context with the RAN is maintained by the UE.

Example Embodiment 7

The method of any of Example embodiments 1 to 6, wherein communicating with the wireless network in accordance with the selected state configuration comprises maintaining light connection management with the RAN on at least one of uplink and downlink when operating in the first energy-conserving operating state.

Example Embodiment 8

The method of any of Example embodiments 1 to 7, wherein maintaining light connection management with the RAN on at least one of uplink and downlink comprises maintaining light connection management on uplink and downlink when operating in the first energy-conserving operating state.

Example Embodiment 9

The method of any of Example embodiments 1 to 7, wherein communicating with the wireless network in accordance with the selected state configuration comprises configuring the UE for grant-free uplink transmission in the first energy-conserving operating state.

Example Embodiment 10

The method of any of Example embodiments 1 to 6, wherein communicating with the wireless network in accordance with the selected state configuration comprises configuring the UE with a tracking channel in the first energy-conserving operating state to facilitate periodic location tracking of the UE.

Example Embodiment 11

The method of any of Example embodiments 1 to 6, wherein the selected state configuration further comprises an active operating state in which the UE performs active connection management with the RAN on uplink and downlink.

Example Embodiment 12

The method of any of Example embodiments 1 to 11, wherein the selected state configuration includes a state transition path from the second energy-conserving operating state to the active operating state, but does not include a state transition path from the second energy-conserving operating state to the first energy-conserving operating state.

Example Embodiment 13

The method of any of Example embodiments 1 to 11, wherein transitioning between the first-energy conserving operating state and the active operating state is contention-free.

Example Embodiment 14

The method of any of Example embodiments 1 to 11, wherein:
the selected state configuration further comprises an enhanced CONNECTED operating state; and
the active operating state and the first energy-conserving operating state are sub-states of the enhanced CONNECTED operating state.

Example Embodiment 15

The method of any of Example embodiments 1 to 14, wherein transitions between the sub-states of the enhanced CONNECTED operating state are done without explicit state transition signalling to the wireless network.

Example Embodiment 16

The method of any of Example embodiments 1 to 11, wherein:
the selected state configuration further comprises an enhanced IDLE operating state; and
the first energy-conserving operating state and the second energy-conserving operating state are sub-states of the enhanced IDLE operating state.

Example Embodiment 17

The method of any of Example embodiments 1 to 16, wherein transitions between the sub-states of the enhanced IDLE operating state are done without explicit state transition signalling to the wireless network.

Example Embodiment 18

The method of any of Example embodiments 1 to 16, wherein, in the enhanced IDLE operating state, the UE is configured to operate in one of the sub-states of the enhanced IDLE operating state based on services supported by the UE and/or a UE type associated with the UE.

Example Embodiment 19

A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions to:
select a state configuration from among a plurality of candidate state configurations, each candidate state configuration being associated with a respective set of one or more predefined operating states; and
communicate, via the wireless interface, with a wireless network in accordance with the selected state configuration.

Example Embodiment 20

The UE of Example embodiment 19, wherein the instructions to select a state configuration from among a plurality of candidate state configurations comprises instructions to:
select a state configuration from among the plurality of candidate state configurations based at least in part on at least one of: a UE type associated with the UE; and one or more services supported by the UE.

Example Embodiment 21

The UE of Example embodiment 20, wherein the programming further comprises instructions to:
select a replacement state configuration from among the plurality of candidate state configurations responsive to a change to the one or more services supported by the UE; and
communicate, via the wireless interface, with the wireless network in accordance with the selected replacement state configuration.

Example Embodiment 22

The UE of any of Example embodiments 19 to 21, wherein:
the UE supports multiple services, including at least a first service and a second service;
the instructions to select a state configuration comprise instructions to:
select a first state configuration from among the plurality of candidate state configurations based at least in part on the first service supported by the UE; and
select a second state configuration from among the plurality of candidate state configurations based at least in part on the second service supported by the UE; and the instructions to communicate with the wireless network in accordance with the selected state configuration comprise instructions to:
communicate with the wireless network in respect of the first service in accordance with the first selected state configuration; and
communicate with the wireless network in respect of the second service in accordance with the second selected state configuration.

Example Embodiment 23

The UE of any of Example embodiments 19 to 22, wherein:
the instructions to communicate with the wireless network in respect of the first service in accordance with the first selected state configuration comprise instructions to communicate with a first network slice of the wireless network in accordance with the first selected state configuration; and
the instructions to communicate with the wireless network in respect of the second service in accordance with the second selected state configuration comprise instructions to communicate with a second network slice of the wireless network in accordance with the second selected state configuration.

Example Embodiment 24

The UE of any of Example embodiments 19 to 23, wherein the selected state configuration comprises at least:
a first energy-conserving operating state in which UE context with a radio access network (RAN) is maintained; and
a second energy-conserving operating state in which no UE context with the RAN is maintained by the UE.

Example Embodiment 25

The UE of any of Example embodiments 19 to 24, wherein the instructions to communicate with the wireless network in accordance with the selected state configuration comprise instructions to maintain light connection management with the wireless network on at least one of uplink and downlink when operating in the first energy-conserving operating state.

Example Embodiment 26

The UE of any of Example embodiments 19 to 25, wherein the UE is configured for grant-free uplink transmission in the first energy-conserving operating state.

Example Embodiment 27

The UE of any of Example embodiments 19 to 24, wherein the operating states of the state machine further comprise:
an active operating state in which the UE performs active connection management with the RAN on uplink and downlink.

Example Embodiment 28

The UE of any of Example embodiments 19 to 27, wherein transitioning between the first-energy conserving operating state and the active operating state is contention-free.

Example Embodiment 29

The UE of Example embodiment 27, wherein:
the operating states of the state machine further comprise an enhanced CONNECTED operating state; and
the active operating state and the first energy-conserving operating state are sub-states of the enhanced CONNECTED operating state.

Example Embodiment 30

The UE of any of Example embodiments 19 to 29, wherein transitions between the sub-states of the enhanced CONNECTED operating state are done without explicit state transition signalling to the RAN.

Example Embodiment 31

The UE of any of Example embodiments 19 to 27, wherein:
the operating states of the state machine further comprise an enhanced IDLE operating state; and
the first energy-conserving operating state and the second energy-conserving operating state are sub-states of the enhanced IDLE operating state.

Example Embodiment 32

The UE of any of Example embodiments 19 to 31, wherein transitions between the sub-states of the enhanced IDLE operating state are done without explicit state transition signalling to the RAN.

Example Embodiment 33

The UE of any of Example embodiments 19 to 31, wherein, in the enhanced IDLE operating state, the UE is configured to operate in one of the sub-states of the enhanced IDLE operating state based on services supported by the UE and/or a UE type associated with the UE.

Example Embodiment 34

A method for operating a user equipment (UE), the method comprising:
the UE operating based on a state machine having a plurality of operating states and state transition paths between at least a subset of the operating states, the plurality of operating states of the state machine comprising at least:
a first energy-conserving operating state in which UE context with a radio access network (RAN) is maintained by the UE; and
a second energy-conserving operating state in which no UE context with the RAN is maintained by the UE.

Example Embodiment 35

The method of Example embodiment 34, wherein operating in the first energy-conserving operating state comprises maintaining light connection management with the RAN on at least one of uplink and downlink.

Example Embodiment 36

The method of Example embodiment 35, wherein, in the first energy-conserving operating state, the UE maintains light connection management on uplink and downlink.

Example Embodiment 37

The method of any of Example embodiments 34 to 36, wherein the UE is configured for grant-free uplink transmission in the first energy-conserving operating state.

Example Embodiment 38

The method of any of Example embodiments 34 to 37, wherein, in the first energy-conserving operating state, the UE is configured with a tracking channel to facilitate periodic location tracking of the UE.

Example Embodiment 39

The method of any of Example embodiments 34 to 38, wherein the operating states of the state machine further comprise:
an active operating state in which the UE performs active connection management with the RAN on uplink and downlink.

Example Embodiment 40

The method of any of Example embodiments 34 to 39, wherein the state machine includes a state transition path from the second energy-conserving operating state to the active operating state, but does not include a state transition path from the second energy-conserving operating state to the first energy-conserving operating state.

Example Embodiment 41

The method of any of Example embodiments 34 to 39, wherein transitioning between the first-energy conserving operating state and the active operating state is contention-free.

Example Embodiment 42

The method of any of Example embodiments 34 to 39, wherein:
the operating states of the state machine further comprise an enhanced CONNECTED operating state; and
the active operating state and the first energy-conserving operating state are sub-states of the enhanced CONNECTED operating state.

Example Embodiment 43

The method of any of Example embodiments 34 to 42, wherein transitions between the sub-states of the enhanced CONNECTED operating state are done without explicit state transition signalling to the RAN.

Example Embodiment 44

The method of any of Example embodiments 34 to 39, wherein:

the operating states of the state machine further comprise an enhanced IDLE operating state; and
the first energy-conserving operating state and the second energy-conserving operating state are sub-states of the enhanced IDLE operating state.

Example Embodiment 45

The method of any of Example embodiments 34 to 44, wherein transitions between the sub-states of the enhanced IDLE operating state are done without explicit state transition signalling to the RAN.

Example Embodiment 46

The method of any of Example embodiments 34 to 44, wherein, in the enhanced IDLE operating state, the UE is configured to operate in one of the sub-states of the enhanced IDLE operating state based on services supported by the UE and/or a UE type associated with the UE.

Example Embodiment 47

A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions to:
operate the UE based on a state machine having a plurality of operating states and state transition paths between at least a subset of the operating states, the operating states of the state machine comprising at least:
a first energy-conserving operating state in which UE context with a radio access network (RAN) is maintained by the UE; and
a second energy-conserving operating state in which no UE context with the RAN is maintained by the UE.

Example Embodiment 48

The UE of Example embodiment 47, wherein operating in the first energy-conserving operating state comprises maintaining light connection management with the RAN on at least one of uplink and downlink.

Example Embodiment 49

The UE of Example embodiment 48, wherein, in the first energy-conserving operating state, the UE maintains light connection management on uplink and downlink.

Example Embodiment 50

The UE of Example embodiment 48, wherein the UE is configured for grant-free uplink transmission in the first energy-conserving operating state.

Example Embodiment 51

The UE of any of Example embodiments 47 to 51, wherein the operating states of the state machine further comprise:

an active operating state in which the UE performs active connection management with the RAN on uplink and downlink.

Example Embodiment 52

The UE of any of Example embodiments 47 to 51, wherein transitioning between the first-energy conserving operating state and the active operating state is contention-free.

Example Embodiment 53

The UE of any of Example embodiments 47 to 51, wherein:
the operating states of the state machine further comprise an enhanced CONNECTED operating state; and
the active operating state and the first energy-conserving operating state are sub-states of the enhanced CONNECTED operating state.

Example Embodiment 54

The UE of any of Example embodiments 47 to 53, wherein transitions between the sub-states of the enhanced CONNECTED operating state are done without explicit state transition signalling to the RAN.

Example Embodiment 55

The UE of any of Example embodiments 47 to 51, wherein:
the operating states of the state machine further comprise an enhanced IDLE operating state; and
the first energy-conserving operating state and the second energy-conserving operating state are sub-states of the enhanced IDLE operating state.

Example Embodiment 56

The UE of any of Example embodiments 47 to 55, wherein transitions between the sub-states of the enhanced IDLE operating state are done without explicit state transition signalling to the RAN.

Example Embodiment 57

The UE of any of Example embodiments 47 to 55, wherein, in the enhanced IDLE operating state, the UE is configured to operate in one of the sub-states of the enhanced IDLE operating state based on services supported by the UE and/or a UE type associated with the UE.

Example Embodiment 58

A method in a radio access network (RAN) device, the method comprising:
for a user equipment (UE) operating based on a state machine having a plurality of operating states and state transition paths between at least a subset of the operating states, the operating states of the state machine comprising at least a first energy-conserving operating state and a second energy-conserving operating state:
maintaining UE context information for the UE when the UE is operating in the first energy-conserving operating state; and not maintaining UE context information for the UE when the UE is operating in the second energy-conserving operating state.

Example Embodiment 59

The method of Example embodiment 58, further comprising maintaining light connection management with the UE on at least one of uplink and downlink when the UE is operating in the first energy-conserving operating state.

Example Embodiment 60

The method of Example embodiment 59, further comprising receiving a grant-free uplink transmission from the UE when the UE is operating in the first energy-conserving operating state.

Example Embodiment 61

The method of any of Example embodiments 58 to 60, further comprising the network device performing location tracking of the UE when the UE is operating in the first energy-conserving operating state.

Example Embodiment 62

The method of any of Example embodiments 58 to 61, wherein the operating states of the state machine further comprise an active operating state, the method further comprising:
performing active connection management with the UE on uplink and downlink when the UE is operating in the active operating state.

Example Embodiment 63

The method of any of Example embodiments 58 to 62, wherein:
the operating states of the state machine further comprise an enhanced CONNECTED operating state; and
the active operating state and the first energy-conserving operating state are sub-states of the enhanced CONNECTED operating state.

Example Embodiment 64

The method of any of Example embodiments 58 to 62, wherein:
the operating states of the state machine further comprise an enhanced IDLE operating state; and
the first energy-conserving operating state and the second energy-conserving operating state are sub-states of the enhanced IDLE operating state.

Example Embodiment 65

The method of any of Example embodiments 58 to 64, wherein, for the enhanced IDLE operating state of the UE, the network device is configured to communicate with the UE in accordance with one of the sub-states of the enhanced IDLE operating state based on services supported by the UE and/or a UE type associated with the UE.

Example Embodiment 66

A network device comprising:
a wireless interface;
a processor operatively coupled to the wireless interface; and
a computer readable storage medium operatively coupled to the processor, the computer readable storage medium storing programming for execution by the processor, the programming comprising instructions to:
for a user equipment (UE) operating based on a state machine having a plurality of operating states and state transition paths between at least a subset of the operating states, the operating states of the state machine comprising at least a first energy-conserving operating state and a second energy-conserving operating state:
maintain UE context information for the UE when the UE is operating in the first energy-conserving operating state; and
not maintain UE context information for the UE when the UE is operating in the second energy-conserving operating state.

Example Embodiment 67

The network device of Example embodiment 66, wherein the programming further comprises instructions to maintain light connection management with the UE on at least one of uplink and downlink when the UE is operating in the first energy-conserving operating state.

Example Embodiment 68

The network device of Example embodiment 67, the programming comprising instructions to monitor for grant-free uplink transmission from the UE when the UE is operating in the first energy-conserving operating state.

Example Embodiment 69

The network device of any of Example embodiments 66 to 68, wherein the programming further comprises instructions to perform a location tracking procedure for the UE when the UE is operating in the first energy-conserving operating state.

Example Embodiment 70

The network device of any of Example embodiments 66 to 69, wherein:
the operating states of the state machine further comprise an active operating state; and
the programming further comprises instructions to perform active connection management with the UE on uplink and downlink when the UE is operating in the active operating state.

Example Embodiment 71

The network device of any of Example embodiments 66 to 70, wherein:
the operating states of the state machine further comprise an enhanced CONNECTED operating state; and
the active operating state and the first energy-conserving operating state are sub-states of the enhanced CONNECTED operating state.

Example Embodiment 72

The network device of any of Example embodiments 66 to 70, wherein:

the operating states of the state machine further comprise an enhanced IDLE operating state; and
the first energy-conserving operating state and the second energy-conserving operating state are sub-states of the enhanced IDLE operating state.

Example Embodiment 73

The network device of any of Example embodiments 66 to 72, wherein, for the enhanced IDLE operating state of the UE, the network device is configured to communicate with the UE in accordance with one of the sub-states of the enhanced IDLE operating state based on services supported by the UE and/or a UE type associated with the UE.

Numerous modifications and variations of the present application are possible in light of the above teachings. It is therefore to be understood that within the scope of the appended claims, the application may be practised otherwise than as specifically described herein.

In addition, although described primarily in the context of methods, device and equipment, other implementations are also contemplated, such as in the form of instructions stored on a non-transitory computer-readable medium, for example.

We claim:

1. A method for supporting multiple user equipment (UE) state configurations in a wireless network, the method comprising:
selecting, by a network device for a UE, a first state configuration from among a plurality of candidate state configurations based at least in part on a first service supported by the UE, each candidate state configuration being associated with a respective one or more predefined operating states;
selecting, by the network device for the UE, a second state configuration from among the plurality of candidate state configurations based at least in part on a second service supported by the UE;
transmitting, by the network device, information to the UE regarding the selected first and second state configurations;
providing the first service in a first network slice in accordance with the first state configuration; and
providing the second service in a second network slice in accordance with the second state configuration.

2. The method of claim 1, wherein selecting the first and second state configurations is further based on a UE type associated with the UE.

3. The method of claim 2, further comprising:
receiving, by the network device, as part of a UE air interface capability exchange procedure, information regarding at least one of: the UE type associated with the UE; and the services supported by the UE.

4. The method of claim 2, further comprising:
receiving, by the network device, as part of a UE supported service change procedure, information regarding a change to the services supported by the UE;
responsive to receiving the information regarding the change to the one or more services supported by the UE, selecting, by the network device, a replacement state configuration from among the plurality of candidate state configurations based at least in part on the information regarding the change to the services supported by the UE; and
transmitting, by the network device, information to the UE regarding the selected replacement state configuration.

5. The method of claim 1, wherein the one or more predefined operating states comprises at least two of the following operating states: an ACTIVE state, an ECO state; an IDLE state; an enhanced IDLE state; and an enhanced ECO state.

6. The method of claim 1, wherein each candidate state configuration further indicates one or more valid state transition paths between the associated predefined operating states.

7. The method of claim 1, wherein the plurality of candidate state configurations comprises at least two of the following candidate state configurations:
a candidate state configuration associated with a set of predefined operating states that includes an ACTIVE state and an ECO state;
a candidate state configuration associated with a set of predefined operating states that includes an ECO state and an IDLE state;
a candidate state configuration associated with a set of predefined operating states that includes an ACTIVE state, an ECO state, and an IDLE state;
a candidate state configuration associated with a set of predefined operating states that includes an ACTIVE state and an IDLE state;
a candidate state configuration associated with a set of predefined operating states that includes an enhanced CONNECTED state and an IDLE state; and
a candidate state configuration associated with a set of predefined operating states that includes an enhanced IDLE state and an ACTIVE state.

8. The method of claim 7, wherein the enhanced CONNECTED state includes therein ACTIVE and ECO sub-states with state transition paths therebetween within the enhanced CONNECTED state.

9. The method of claim 7, wherein the enhanced IDLE state includes therein IDLE and ECO sub-states with transition paths therebetween within the enhanced IDLE state.

10. The method of claim 1, wherein at least one of the selected first and second state configurations is associated with at least an energy-conserving operating state, the method further comprising:
maintaining UE context information for the UE in the energy-conserving operating state.

11. A method for supporting multiple user equipment (UE) state configurations in a wireless network, the method comprising:
selecting, by a network device for a UE, a state configuration for multiple network slices supported by the UE, the state configuration being selected from among a plurality of candidate state configurations, each candidate state configuration being associated with a respective one or more predefined operating states, and each of the multiple network slices being associated with a respective state configuration among the plurality of candidate state configurations;
transmitting, by the network device, information to the UE regarding the selected state configuration;
providing a first service to the UE in a first network slice of the multiple network slices supported by the UE in accordance with the selected state configuration; and
providing a second service to the UE in a second network slice of the multiple network slices supported by the UE in accordance with the selected state configuration.

12. The method of claim 11, wherein selecting the state configuration is further based on a UE type associated with the UE.

13. The method of claim 12, further comprising:
receiving, by the network device, as part of a UE air interface capability exchange procedure, information regarding at least one of: the UE type associated with the UE; and the services supported by the UE.

14. The method of claim 12, further comprising:
receiving, by the network device, as part of a UE supported service change procedure, information regarding a change to the services supported by the UE;
responsive to receiving the information regarding the change to the one or more services supported by the UE, selecting, by the network device, a replacement state configuration from among the plurality of candidate state configurations based at least in part on the information regarding the change to the services supported by the UE; and
transmitting, by the network device, information to the UE regarding the selected replacement state configuration.

15. The method of claim 11, wherein the one or more predefined operating states comprises at least two of the following operating states: an ACTIVE state, an ECO state; an IDLE state; an enhanced IDLE state; and an enhanced ECO state.

16. The method of claim 11, wherein each candidate state configuration further indicates one or more valid state transition paths between the associated predefined operating states.

17. The method of claim 11, wherein the plurality of candidate state configurations comprises at least two of the following candidate state configurations:
a candidate state configuration associated with a set of predefined operating states that includes an ACTIVE state and an ECO state;
a candidate state configuration associated with a set of predefined operating states that includes an ECO state and an IDLE state;
a candidate state configuration associated with a set of predefined operating states that includes an ACTIVE state, an ECO state, and an IDLE state;
a candidate state configuration associated with a set of predefined operating states that includes an ACTIVE state and an IDLE state;
a candidate state configuration associated with a set of predefined operating states that includes an enhanced CONNECTED state and an IDLE state; and
a candidate state configuration associated with a set of predefined operating states that includes an enhanced IDLE state and an ACTIVE state.

18. The method of claim 17, wherein the enhanced CONNECTED state includes therein ACTIVE and ECO sub-states with state transition paths therebetween within the enhanced CONNECTED state.

19. The method of claim 17, wherein the enhanced IDLE state includes therein IDLE and ECO sub-states with transition paths therebetween within the enhanced IDLE state.

20. The method of claim 11, wherein the selected state configuration is associated with at least an energy-conserving operating state, the method further comprising:
maintaining UE context information for the UE in the energy-conserving operating state.

21. A network device comprising:
a wireless interface;
a processor operatively coupled to the wireless interface; and
a computer readable storage medium operatively coupled to the processor, the computer readable storage medium storing programming for execution by the processor, the programming comprising instructions to:
select, for a user equipment (UE), a first state configuration from among a plurality of candidate state configurations based at least in part on a first service supported by the UE, each candidate state configuration being associated with a respective one or more predefined operating states;
select, for the UE, a second state configuration from among the plurality of candidate state configurations based at least in part on a second service supported by the UE;
transmit, via the wireless interface, information to the UE regarding the selected first and second state configurations;
provide the first service in a first network slice in accordance with the first state configuration; and
provide the second service in a second network slice in accordance with the second state configuration.

22. The network device of claim 21, wherein the instructions to select the first and second state configurations comprise instructions to select the state configurations further based on a UE type associated with the UE.

23. The network device of claim 22, wherein the programming further comprises instructions to receive, via the wireless interface, as part of a UE air interface capability exchange procedure, information regarding at least one of: the UE type associated with the UE; and the services supported by the UE.

24. The network device of claim 22, wherein the programming further comprises instructions to:
receive, via the wireless interface, as part of a UE supported service change procedure, information regarding a change to the services supported by the UE;
responsive to receiving the information regarding the change to the one or more services supported by the UE, select a replacement state configuration from among the plurality of candidate state configurations based at least in part on the information regarding the change to the services supported by the UE; and
transmit, via the wireless interface, information to the UE regarding the selected replacement state configuration.

25. The network device of claim 21, wherein the one or more predefined operating states comprises at least two of the following operating states: an ACTIVE state, an ECO state; an IDLE state; an enhanced IDLE state; and an enhanced ECO state.

26. The network device of claim 21, wherein each candidate state configuration further indicates one or more valid state transition paths between the associated predefined operating states.

27. The network device of claim 21, wherein the plurality of candidate state configurations comprises at least two of the following candidate state configurations:
a candidate state configuration associated with a set of predefined operating states that includes an ACTIVE state and an ECO state;
a candidate state configuration associated with a set of predefined operating states that includes an ECO state and an IDLE state;
a candidate state configuration associated with a set of predefined operating states that includes an ACTIVE state, an ECO state, and an IDLE state;
a candidate state configuration associated with a set of predefined operating states that includes an ACTIVE state and an IDLE state;

a candidate state configuration associated with a set of predefined operating states that includes an enhanced CONNECTED state and an IDLE state; and a candidate state configuration associated with a set of predefined operating states that includes an enhanced IDLE state and an ACTIVE state.

28. The network device of claim 27, wherein the enhanced CONNECTED state includes therein ACTIVE and ECO sub-states with state transition paths therebetween within the enhanced CONNECTED state.

29. The network device of claim 27, wherein the enhanced IDLE state includes therein IDLE and ECO sub-states with transition paths therebetween within the enhanced IDLE state.

30. The network device of claim 21 wherein at least one of the selected first and second state configurations is associated with at least an energy-conserving operating state, the programming further comprises instructions to:

maintain UE context information for the UE in the energy-conserving operating state.

31. A network device comprising:
a wireless interface;
a processor operatively coupled to the wireless interface; and
a computer readable storage medium operatively coupled to the processor, the computer readable storage medium storing programming for execution by the processor, the programming comprising instructions to:
  select, for a user equipment (UE), a state configuration for multiple network slices supported by the UE, the state configuration being selected from among a plurality of candidate state configurations, each candidate state configuration being associated with a respective one or more predefined operating states, and each of the multiple network slices being associated with a respective state configuration among the plurality of candidate state configurations;
  transmit, via the wireless interface, information to the UE regarding the selected state configuration;
  provide services to the UE in a first network slice of the multiple network slices supported by the UE in accordance with the selected state configuration; and
  provide services to the UE in a second network slice of the multiple network slices supported by the UE in accordance with the selected state configuration.

32. The network device of claim 31, wherein the instructions to select the state configuration comprise instructions to select the state configuration further based on a UE type associated with the UE.

33. The network device of claim 32, wherein the programming further comprises instructions to receive, via the wireless interface, as part of a UE air interface capability exchange procedure, information regarding at least one of: the UE type associated with the UE; and the services supported by the UE.

34. The network device of claim 32, wherein the programming further comprises instructions to:
receive, via the wireless interface, as part of a UE supported service change procedure, information regarding a change to the services supported by the UE;
responsive to receiving the information regarding the change to the one or more services supported by the UE, select a replacement state configuration from among the plurality of candidate state configurations based at least in part on the information regarding the change to the services supported by the UE; and transmit, via the wireless interface, information to the UE regarding the selected replacement state configuration.

35. The network device of claim 31, wherein the one or more predefined operating states comprises at least two of the following operating states: an ACTIVE state, an ECO state; an IDLE state; an enhanced IDLE state; and an enhanced ECO state.

36. The network device of claim 31, wherein each candidate state configuration further indicates one or more valid state transition paths between the associated predefined operating states.

37. The network device of claim 31, wherein the plurality of candidate state configurations comprises at least two of the following candidate state configurations:

a candidate state configuration associated with a set of predefined operating states that includes an ACTIVE state and an ECO state;

a candidate state configuration associated with a set of predefined operating states that includes an ECO state and an IDLE state;

a candidate state configuration associated with a set of predefined operating states that includes an ACTIVE state, an ECO state, and an IDLE state;

a candidate state configuration associated with a set of predefined operating states that includes an ACTIVE state and an IDLE state;

a candidate state configuration associated with a set of predefined operating states that includes an enhanced CONNECTED state and an IDLE state; and a candidate state configuration associated with a set of predefined operating states that includes an enhanced IDLE state and an ACTIVE state.

38. The network device of claim 37, wherein the enhanced CONNECTED state includes therein ACTIVE and ECO sub-states with state transition paths therebetween within the enhanced CONNECTED state.

39. The network device of claim 37, wherein the enhanced IDLE state includes therein IDLE and ECO sub-states with transition paths therebetween within the enhanced IDLE state.

40. The network device of claim 31 wherein the selected state configuration is associated with at least an energy-conserving operating state, the programming further comprises instructions to:
maintain UE context information for the UE in the energy-conserving operating state.

41. A method for supporting multiple UE state configurations in a wireless network, the method comprising:
receiving, by a user equipment (UE), from the wireless network, information regarding a first state configuration selected for the UE, the UE supporting multiple services including at least a first service and a second service, the selected first state configuration having been selected from among a plurality of candidate state configurations based at least in part on the first service supported by the UE, each candidate state configuration being associated with a respective one or more predefined operating states;
receiving, by the UE, information regarding a second state configuration selected from among the plurality of candidate state configurations based at least in part on the second service supported by the UE;
communicating, by the UE, with a first network slice of the wireless network in respect of the first service in accordance with the first selected state configuration; and communicating, by the UE, with a second network slice of the wireless network in respect of the second service in accordance with the second selected state configuration.

42. The method of claim 41, further comprising:
transmitting, by the UE, as part of a UE air interface capability exchange procedure, information regarding a UE type associated with the UE and the services supported by the UE,
wherein the first and second state configurations selected for the UE are selected from among the plurality of candidate state configurations based at least in part on the information regarding the UE type associated with the UE and the information regarding the services supported by the UE.

43. The method of claim 42, further comprising:
transmitting, by the UE, as part of a UE supported service change procedure, information regarding a change to the services supported by the UE;
receiving, by the UE, from the wireless network, information regarding a replacement state configuration selected for the UE from among the plurality of candidate state configurations based at least in part on the information regarding the change to the services supported by the UE; and
communicating, by the UE, with the wireless network in accordance with the selected replacement state configuration.

44. The method of claim 41, wherein at least one of the selected first and second state configurations is associated with at least an energy-conserving operating state in which UE context is maintained by the UE with the wireless network.

45. The method of claim 41, wherein each candidate state configuration further indicates one or more valid state transition paths between the associated predefined operating states.

46. A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions to:
receive, via the wireless interface, from a wireless network, information regarding a first state configuration selected for the UE, the UE supporting multiple services including at least a first service and a second service, the selected first state configuration having been selected from among a plurality of candidate state configurations based at least in part on a first service supported by the UE, each candidate state configuration being associated with a respective one or more predefined operating states;
receive, via the wireless interface, information regarding a second state configuration selected from among the plurality of candidate state configurations based at least in part on a second service supported by the UE;
communicate with a first network slice of the wireless network in respect of the first service in accordance with the first selected state configuration; and
communicate with a second network slice of the wireless network in respect of the second service in accordance with the second selected state configuration.

47. The UE of claim 46, wherein the programming further comprises instructions to:

transmit, via the wireless interface, as part of a UE air interface capability exchange procedure, information regarding a UE type associated with the UE and the services supported by the UE,
wherein the first and second state configurations selected for the UE are selected from among the plurality of candidate state configurations based at least in part on the information regarding the UE type associated with the UE and the information regarding the services supported by the UE.

48. The UE of claim 47, wherein the programming further comprises instructions to:
transmit, via the wireless interface, as part of a UE supported service change procedure, information regarding a change to the services supported by the UE;
receive, via the wireless interface, from the wireless network, information regarding a replacement state configuration selected for the UE from among the plurality of candidate state configurations based at least in part on the information regarding the change to the services supported by the UE; and
communicate, via the wireless interface, with the wireless network in accordance with the selected replacement state configuration.

49. The UE of claim 46, wherein at least one of the selected first and second state configurations is associated with at least an energy-conserving operating state in which UE context is maintained by the UE with the wireless network.

50. The UE of claim 46, wherein each candidate state configuration further indicates one or more valid state transition paths between the associated predefined operating states.

51. A method for supporting multiple UE state configurations in a wireless network, the method comprising:
receiving, by a user equipment (UE), from the wireless network, information regarding a state configuration for multiple network slices supported by the UE, the state configuration having been selected from among a plurality of candidate state configurations, each candidate state configuration being associated with a respective one or more predefined operating states, and each of the multiple network slices being associated with a respective state configuration among the plurality of candidate state configurations;
communicating, by the UE, with a first network slice of the wireless network in respect of a first service in accordance with the selected state configuration; and
communicating, by the UE, with a second network slice of the wireless network in respect of a second service in accordance with the selected state configuration.

52. The method of claim 51, further comprising:
transmitting, by the UE, as part of a UE air interface capability exchange procedure, information regarding a UE type associated with the UE and the services supported by the UE,
wherein the state configuration selected for the UE is selected from among the plurality of candidate state configurations based at least in part on the information regarding the UE type associated with the UE and the information regarding the services supported by the UE.

53. The method of claim 52, further comprising:
transmitting, by the UE, as part of a UE supported service change procedure, information regarding a change to the services supported by the UE;

receiving, by the UE, from the wireless network, information regarding a replacement state configuration selected for the UE from among the plurality of candidate state configurations based at least in part on the information regarding the change to the services supported by the UE; and communicating, by the UE, with the wireless network in accordance with the selected replacement state configuration.

54. The method of claim 51, wherein the selected state configuration is associated with at least an energy-conserving operating state in which UE context is maintained by the UE with the wireless network.

55. The method of claim 51, wherein each candidate state configuration further indicates one or more valid state transition paths between the associated predefined operating states.

56. A user equipment (UE) comprising:
a wireless interface;
a processor operatively coupled to the wireless interface; and
a computer readable storage medium operatively coupled to the processor, the computer readable storage medium storing programming for execution by the processor, the programming comprising instructions to:
receive, via the wireless interface, from a wireless network, information regarding a state configuration for multiple network slices supported by the UE, the state configuration having been selected from among a plurality of candidate state configurations, each candidate state configuration being associated with a respective one or more predefined operating states, and each of the multiple network slices being associated with a respective state configuration among the plurality of candidate state configurations;
communicate with a first network slice of the wireless network in respect of a first service in accordance with the selected state configuration; and
communicate with a second network slice of the wireless network in respect of a second service in accordance with the selected state configuration.

57. The UE of claim 56, wherein the programming further comprises instructions to:
transmit, via the wireless interface, as part of a UE air interface capability exchange procedure, information regarding a UE type associated with the UE and the services supported by the UE,
wherein the state configuration selected for the UE is selected from among the plurality of candidate state configurations based at least in part on the information regarding the UE type associated with the UE and the information regarding the services supported by the UE.

58. The UE of claim 57, wherein the programming further comprises instructions to:
transmit, via the wireless interface, as part of a UE supported service change procedure, information regarding a change to the services supported by the UE;
receive, via the wireless interface, from the wireless network, information regarding a replacement state configuration selected for the UE from among the plurality of candidate state configurations based at least in part on the information regarding the change to the services supported by the UE; and
communicate, via the wireless interface, with the wireless network in accordance with the selected replacement state configuration.

59. The UE of claim 56, wherein the selected state configuration is associated with at least an energy-conserving operating state in which UE context is maintained by the UE with the wireless network.

60. The UE of claim 56, wherein each candidate state configuration further indicates one or more valid state transition paths between the associated predefined operating states.

* * * * *